US008115118B2

(12) United States Patent
Kawanishi

(10) Patent No.: US 8,115,118 B2
(45) Date of Patent: Feb. 14, 2012

(54) COMBINATION WEIGHER WITH MEMORY HOPPERS THAT CALCULATES A FIRST AND SECOND OPTIMUM COMBINATIONS FOR DISCHARGE INTO TWO DIFFERENT CHUTES

(75) Inventor: Shozo Kawanishi, Nishinomiya (JP)

(73) Assignee: Shozo Kawanishi, Nishinomiya-shi (JP)

( * ) Notice: Subject to any disclaimer, the term of this patent is extended or adjusted under 35 U.S.C. 154(b) by 526 days.

(21) Appl. No.: 12/097,232

(22) PCT Filed: Dec. 8, 2006

(86) PCT No.: PCT/JP2006/324549
§ 371 (c)(1),
(2), (4) Date: Jul. 6, 2009

(87) PCT Pub. No.: WO2007/069544
PCT Pub. Date: Jun. 21, 2007

(65) Prior Publication Data
US 2009/0294183 A1  Dec. 3, 2009

(30) Foreign Application Priority Data

Dec. 13, 2005 (JP) ................... 2005-358515
Feb. 21, 2006 (JP) ................... 2006-043524

(51) Int. Cl.
*G01G 19/387* (2006.01)
(52) U.S. Cl. .................................... 177/25.18
(58) Field of Classification Search ............... 177/25.18
See application file for complete search history.

(56) References Cited

U.S. PATENT DOCUMENTS

| 4,399,880 | A | | 8/1983 | Konishi | |
|---|---|---|---|---|---|
| 4,570,727 | A | * | 2/1986 | Ueda | 177/25.18 |
| 4,602,709 | A | * | 7/1986 | Ueda | 193/2 R |
| 4,614,262 | A | * | 9/1986 | Konishi | 193/23 |
| 4,657,129 | A | * | 4/1987 | Mikami | 193/2 R |

(Continued)

FOREIGN PATENT DOCUMENTS
JP         57-125322         8/1982
(Continued)

OTHER PUBLICATIONS

Decision to Grant for Russian Patent Application No. 200812448/28(035030).

(Continued)

*Primary Examiner* — Randy W Gibson
(74) *Attorney, Agent, or Firm* — Marshall, Gerstein & Borun LLP

(57) ABSTRACT

A combination weigher of the present invention comprises a first combination weigher unit including a left inner chute, an outer chute, collecting hoppers, weighing hoppers and memory hoppers which are disposed above the left chutes, and a second combination weigher unit including a right inner chute, an outer chute, collecting hoppers, weighing hoppers and memory hoppers which are disposed above the right chutes, and a control unit configured to control the entire combination weigher. The control unit performs a combination process for each combination weigher unit and causes weighing hoppers and memory hoppers which make up of discharge combinations determined in respective combination processes to discharge the objects to be weighed in an inward direction and an outward direction alternately, and to cause the two collecting hoppers to alternately discharge the objects to be weighed according to the discharge, in each combination weigher unit.

9 Claims, 14 Drawing Sheets

U.S. PATENT DOCUMENTS

| | | | | |
|---|---|---|---|---|
| 4,676,325 A * | 6/1987 | Yamano et al. | ............ | 177/1 |
| 4,676,326 A * | 6/1987 | Konishi | ............ | 177/1 |
| 4,693,355 A * | 9/1987 | Bochi et al. | ............ | 193/2 R |
| 4,706,766 A * | 11/1987 | Yamano et al. | ............ | 177/1 |
| 4,709,769 A * | 12/1987 | Yamano et al. | ............ | 177/1 |
| 4,742,877 A * | 5/1988 | Kawanishi | ............ | 177/1 |
| 4,967,856 A * | 11/1990 | Kawanishi et al. | ............ | 177/25.18 |
| 7,538,280 B2 * | 5/2009 | Higuchi et al. | ............ | 177/25.18 |
| 7,566,837 B2 * | 7/2009 | Kawanishi et al. | ............ | 177/25.18 |
| 7,572,986 B2 * | 8/2009 | Kawanishi et al. | ............ | 177/25.18 |
| 7,579,558 B2 * | 8/2009 | Higuchi et al. | ............ | 177/25.18 |
| 2008/0047761 A1 * | 2/2008 | Kawanishi et al. | ............ | 177/25.18 |
| 2008/0245578 A1 * | 10/2008 | Kawanishi et al. | ............ | 177/25.11 |
| 2008/0283307 A1 * | 11/2008 | Kawanishi | ............ | 177/25.18 |
| 2008/0302580 A1 * | 12/2008 | Kawanishi et al. | ............ | 177/25.18 |
| 2009/0152019 A1 * | 6/2009 | Higuchi et al. | ............ | 177/25.18 |
| 2009/0301792 A1 * | 12/2009 | Kawanishi | ............ | 177/25.18 |
| 2010/0096192 A1 * | 4/2010 | Kawanishi | ............ | 177/25.18 |
| 2010/0224421 A1 * | 9/2010 | Kawanishi | ............ | 177/25.18 |
| 2010/0243339 A1 * | 9/2010 | Kawanishi | ............ | 177/145 |

FOREIGN PATENT DOCUMENTS

| | | |
|---|---|---|
| JP | 58-108414 | 6/1983 |
| JP | 62-30122 | 2/1987 |
| JP | 62-254017 A | 11/1987 |
| JP | 01-170815 | 7/1989 |
| JP | 01-170815 A | 7/1989 |
| JP | 03-144318 | 6/1991 |
| JP | 8-1395 | 10/1996 |
| RU | 2229103 C2 | 5/2004 |

OTHER PUBLICATIONS

Office Action for Russian Patent Application No. 2008128448/28(035030).

International Search Report for PCT/JP2006/324549, dated Mar. 7, 2007.

Extended European Search Report for EP Patent Application No. 06834304.5-2213, dated May 6, 2011.

* cited by examiner

COMBINATION WEIGHER WITH MEMORY HOPPERS THAT CALCULATES A FIRST AND SECOND OPTIMUM COMBINATIONS FOR DISCHARGE INTO TWO DIFFERENT CHUTES

TECHNICAL FIELD

The present invention relates to a combination weigher and a weighing system which feed to a packaging machine or the like, objects to be weighed which have been weighed.

BACKGROUND ART

Objects to be weighed, such as detergents and confectionery, which have been weighed to have specified weight by a combination weigher, are typically packaged by a packaging machine. A schematic construction of a first conventional example of such a combination weigher which weighs the objects to be weighed is shown in FIG. 13.

The combination weigher of FIG. 13 is configured such that a control unit 30 controls an operation of the entire combination weigher and performs combination calculation. The combination weigher is constructed in such a manner that a center base body (body) 11 is disposed at a center of the combination weigher, and a dispersion feeder 1 having a conical shape is mounted to an upper part of the center base body 11 to radially disperse objects to be weighed supplied from an external supplying device by vibration. Around the dispersion feeder 1, linear feeders 2 are provided to transfer the objects to be weighed which have been sent from the dispersion feeder 1 into respective feeding hoppers 3 by vibration. A plurality of feeding hoppers 3 and weighing hoppers 4 are disposed below the linear feeders 2 and are arranged in a circular shape in such a manner that each feeding hopper 3 and each weighing hopper 4 correspond to the associated one of the linear feeders 2. The feeding hopper 3 receives the objects to be weighed which have been sent from the linear feeder 2, and opens its gate to feed the objects to be weighed to the weighing hopper 4 located therebelow when the weighing hopper 4 becomes empty. The weighing hopper 4 is attached with a weight sensor 41 such as a load cell. The weight sensor 41 measures weight of the objects to be weighed inside the weighing hopper 4. The control unit 30 performs combination calculation to determine a combination made up of hoppers which will discharge the objects to be weighed, from the plurality of weighing hoppers 4. The weighing hoppers 4 corresponding to the combination discharge the objects to be weighed onto a collecting chute 12. The collecting chute 12 is disposed below the weighing hoppers 4. The objects to be weighed which have been discharged from the weighing hoppers 4 slide down on the collecting chute 12 and are held in a collecting hopper 13 provided at a discharge outlet in a bottom part of the collecting chute 12. Thereafter, the objects to be weighed are sent out to a packaging machine which is not shown. While manufacturing package bags, the packaging machine charges the objects to be weighed which have been discharged from the combination weigher into the package bags and packages them.

In order to enable the combination weigher to be adapted to a high-speed operated packaging machine, it is necessary to provide a collecting hopper 13 at a discharge outlet of the collecting chute 12 so that the objects to be weighed are discharged in a state where they are lumped together, and to shorten a discharge cycle time. To this end, conventionally, the number of weighing hoppers was increased to a certain degree to configure so that a double shift operation is carried out rather than a single shift operation, thereby reducing the discharge cycle time taken for the single shift operation by half. The single shift operation is carried out in a configuration in which, for example, a total number of the weighing hoppers 4 is set to ten, the number of the weighing hoppers 4 selected to make up of a combination is set to four, the combination calculation is performed once within one weighing cycle time, the weighing hoppers 4 perform discharge operation once within one weighing cycle time, and the collecting hopper 13 performs discharge operation with respect to the packaging machine once within one weighing cycle time. In order to achieve weighing precision substantially as high as that in the single shift operation when the double shift operation is carried out, the number of the weighing hoppers 4 is increased by four so that a total number of them is fourteen and the number of the weighing hoppers 4 selected to make up of the combination is set to four. And, the combination calculation is performed once in every ½ of one weighing cycle time, weighing hoppers 4 making up of a combination selected in the combination calculation discharge the objects to be weighed, and according to the discharge, the collecting hopper 13 discharges the objects to be weighed. That is, the combination calculation is performed twice within one weighing cycle time, the weighing hoppers 4 performs the discharge operation twice within one weighing cycle time, and the collecting hopper 13 performs the discharge operation with respect to the packaging machine twice within one weighing cycle time. This makes it possible to improve productivity within a specified time period (the total number of times the combination weigher discharges the objects to be weighed to the packaging machine) and hence to adapt the combination weigher to the high-speed operated packaging machine.

However, even when the conventional combination weigher shown in FIG. 13 is configured to carry out the double shift operation, a batch length of the objects to be weighed which have been discharged from the weighing hoppers 4 and slide on the collecting chute 12 is not reduced. For this reason, a distance between the batches of the objects to be weighed discharged from the weighing hoppers 4 selected to make up of a previous combination and the objects to be weighed discharged from the weighing hoppers 4 selected to make up of a subsequent combination is insufficiently large and the objects to be weighed in the previous and subsequent combinations are likely to be mixed, making it difficult to carry out the double shift operation at a specified operation speed. To solve this problem, two collecting chutes may be provided as shown in FIG. 14.

FIG. 14(a) is a schematic partial cross-sectional view showing a second example of the conventional combination weigher as viewed from laterally. FIG. 14(b) is a schematic view of collecting chutes (inner chute and outer chute) and weighing hoppers of the combination weigher as viewed from above. The combination weigher is configured in such a manner that a lower chute is incorporated into the combination weigher disclosed in a patent document 1 to discharge objects to be weighed into a packaging machine having one inlet.

In the combination weigher, two collecting chutes, i.e., an inner chute 6 and an outer chute 7 are provided, and each weighing hopper 4 has two gates (not shown) to be able to discharge objects to be weighed selectively to the inner chute 6 or the outer chute 7 which is located therebelow. In addition, a collecting hopper 8 is provided at an discharge outlet 6e in a bottom part of the inner chute 6 to hold and discharge the objects to be weighed, and a collecting hopper 9 is provided at an discharge outlet 7e in a bottom part of the outer chute 7 to hold and discharge the objects to be weighed. Furthermore, one lower chute 10 is provided below the two collecting hoppers 8 and 9 to feed the objects to be weighed which have been discharged from the collecting hoppers 8 and 9 into one inlet of the packaging machine. A control unit 31 controls an operation of the entire combination weigher and performs combination calculation. The combination weigher is configured to carry out the double shift operation in such a manner that the weighing hoppers 4 selected sequentially to make up of the combinations discharge the objects to be weighed alternately to the inner chute 6 and the outer chute 7 and the collecting hopper 8 and the collecting hopper 9 alternately discharge the objects to be weighed to the lower chute 10. Thereby, the objects to be weighed are discharged twice from the discharge outlet 10e of the lower chute 10 within one weighing cycle time. So, productivity within a specified time period can be improved. Also, since the weighing hoppers 4 discharge the objects to be weighed to each of the inner chute 6 and the outer chute 7 only once within one weighing cycle time, a sufficient distance is provided between the batches of the objects to be weighed which are discharged previously and the objects to be weighed which are discharged subsequently on each of the chutes.

In cases where the combination weigher is not equipped with the lower chute 10, two packaging machines or a twin-inlet packaging machine having two inlets are/is disposed below the combination weigher, and the objects to be weighed which have been discharged from the collecting hoppers 8 and 9 are fed into the associated packaging machine inlets. In this case, by the double shift operation, the objects to be weighed are discharged once to each of the two packaging machine inlets within one weighing cycle time. That is, the objects to be weighed are discharged twice in total within one weighing cycle time irrespective of the presence or absence of the lower chute 10. Thus, productivity within a specified time period can be improved.

Patent document 1 Japanese Laid-Open Patent Application Publication No. Sho. 57-125322

Patent document 2 Japanese Examined Patent Application Publication No. Hei. 8-1395

DISCLOSURE OF THE INVENTION

Problems to be Solved by the Invention

However, in the configuration of FIG. 14, the outer chute 7 is disposed so that the objects to be weighed which have been discharged from the weighing hopper 4 located closer to the collecting hopper 8 of the inner chute 6 to the outer chute 7 are transferred to the collecting hopper 9 through the outside of the periphery of the inner chute 6. Therefore, the collecting chute consisting of the outer chute and the inner chute is complicated in structure.

In addition, since the collecting hoppers 8 and 9 respectively provided at the inner chute 6 and the outer chute 7 are positioned distant from a center of a circle formed by arrangement of the weighing hoppers 4, a distance over which the objects to be weighed are transferred from the weighing hopper 4 to the collecting hopper 8 and inclination of the chute 6 is varied significantly, and a distance over which the objects to be weighed are transferred from the weighing hopper 4 to the collecting hopper 9 and inclination of the chute 7 is varied significantly, depending on the position of the weighing hopper 4 with respect to the collecting hopper 8 or 9. For this reason, there is a significant variation in time when the objects to be weighed which have been transferred on the chute 6 or 7 reach the collecting hopper 8 or 9. In particular, since the objects to be weighed which have been discharged from the weighing hopper 4 located closer to the collecting hopper 8 of the inner chute 6 to the outer chute 7 are transferred to the collecting hopper 9 through the outside of the periphery of the inner chute 6, they reach at a time that is much later than a time when the objects to be weighed which have been discharged from the weighing hopper 4 located closer to the collecting hopper 9 reach the collecting hopper 9. As a result, there is a significant variation in the time when the objects to be weighed reach the collecting hopper 9. Thus, there is a significant variation in the time when the objects to be weighed which have been discharged simultaneously from the plurality of weighing hoppers 4 to the inner chute 6 or to the outer chute 7 reach the collecting hopper 8 or 9, and time that lapses from when a tip part of the batch of the objects to be weighed reach the collecting hopper 8 or the collecting hopper 9 until a tail part of the batch of the objects to be weighed reach the collecting hopper 8 or to the collecting hopper 9 is long. In this case, also, a sufficient distance is unable to be provided between the batches of the objects to be weighed which are discharged onto the collecting chute 6 or 7 previously and the objects to be weighed which are discharged onto the collecting chute 6 or 7 subsequently and they are likely to be mixed, unless an operation speed is set slow, depending on characteristic of the objects to be weighed, for example, if the objects to be weighed are bulky (bulk density is low). As a result, the combination weigher is unable to operate at a high speed.

The present invention has been made to solve the above described problem, and an object of the present invention is to provide a combination weigher and a weighing system which are equipped with collecting chutes having a relatively simple structure, and are able to operate at a high speed irrespective of characteristics of almost all objects to be weighed.

Means for Solving the Problem

To achieve the above described objective, a combination weigher of the present invention comprises a combination hopper line formed by a plurality of combination hoppers which are arranged in a circular-arc shape having a central angle of approximately 180 degrees or smaller and are fed with objects to be weighed, the plurality of combination hoppers being each configured to be able to discharge the objects to be weighed selectively in an inward direction which is toward a center of the circular-arc shape or in an outward direction which is an opposite direction of the inward direction; an inner chute which is disposed below the combination hopper line and has an upper end portion of a circular-arc shape conforming to the shape of the combination hopper line, the inner chute being configured to gather the objects to be weighed which have been discharged in the inward direction from the combination hoppers and to discharge the objects to be weighed from a discharge outlet provided at a bottom part thereof; an outer chute which is disposed along outside of the inner chute, the outer chute being configured to gather the objects to be weighed which have been discharged in the outward direction from the combination hoppers and to discharge the objects to be weighed from a discharge outlet provided at a bottom part thereof; a first collecting hopper which is provided at the discharge outlet of the inner chute to hold and discharge the objects to be weighed which have been discharged from the discharge outlet of the inner chute; a second collecting hopper which is provided at the discharge outlet of the outer chute to hold and discharge the objects to be weighed which have been discharged from the discharge outlet of the outer chute; a combination calculation means which is configured to determine a first discharge combination and a second discharge combination each of which is made up of combination hoppers in which a combination weight value which is a total of weights of the objects to be weighed which have been fed to the combination hoppers is within an allowable range with respect to a target weight value; and a control means which is configured to cause the combination hoppers making up of the first discharge combination to discharge the objects to be weighed in the inward direction and to cause the combination hoppers making up of the second discharge combination to discharge the objects to be weighed in the outward direction, and is configured to cause the first collecting hopper holding the objects to be weighed which have been discharged from the combination hoppers making up of the first discharge combination to discharge the objects to be weighed and to cause the second collecting hopper holding the objects to be weighed which have been discharged from the combination hoppers making up of the second discharge combination to discharge the objects to be weighed.

In such a configuration, since the inner chute is disposed to correspond to the combination hopper line of the circular-arc shape having a central angle of approximately 180 degrees or smaller, and the outer chute is disposed along outside of the inner chute, the collecting chutes (inner chute and outer chute) can be made to have a relatively simple structure. In addition, it becomes possible to shorten and substantially equalize a distance over which the objects to be weighed which have been discharged from the combination hoppers to the inner chute are transferred to the associated collecting hopper and a distance over which the objects to be weighed which have been discharged from the combination hoppers to the outer chute are transferred to the associated collecting hopper. Irrespective of the characteristics of almost all the objects to be weighed, the objects to be weighed which have been discharged from the combination hoppers can be gathered to the associated collecting hoppers in a short time. Therefore, the collecting chutes can be made to have a relatively simple structure, and the combination weigher is able to operate at a high speed irrespective of the characteristics of almost all the objects to be weighed.

The combination calculation means may be configured to repeatedly perform a combination process in which combination calculation is performed based on the weights of the objects to be weighed which have been fed to the combination hoppers to determine one combination made up of the combination hoppers in which a combination weight value is within the allowable range with respect to the target weight value and to determine the combination as an optimal combination; and the combination calculation means may be configured to repeatedly perform the combination process n (plural number) times in such a manner that, the combination calculation is performed based on weights of objects to be weighed which have been fed to combination hoppers which do not make up of an optimal combination determined in a previous combination process, in a subsequent combination process, and may be configured to determine optimal combinations determined sequentially in the combination process performed repeatedly as the first discharge combination and the second discharge combination alternately; the control means may be configured to cause the combination hoppers making up of the first discharge combination and the combination hoppers making up of the second discharge combination to alternately discharge the objects to be weighed and to cause the first collecting hopper and the second collecting hopper to alternately discharge the objects to be weighed, based on the first discharge combination and the second discharge combination alternately determined by the combination calculation means; and wherein the objects to be weighed which have been discharged from the first collecting hopper and the objects to be weighed which have been discharged from the second collecting hopper may be fed to the same packaging machine inlet.

In such a configuration, since the combination process can be performed n times and the objects to be weighed can be discharged to the same packaging machine inlet n times within one operation cycle time (e.g., one weighing cycle time), productivity (the number of times the objects to be weighed are discharged from the combination weigher to the packaging machine) within a specified time period can be improved. In addition, since the objects to be weighed inside the combination hoppers are discharged to the inner chute and to the outer chute alternately for the respective discharge combinations determined sequentially, that is, the objects to be weighed are discharged from the combination hoppers to the inner chute and to the outer chute only n/2 times within one operation cycle time, a sufficient distance can be provided between the batches of the objects to be weighed which are discharged previously and the objects to be weighed which are discharged subsequently on each of the chutes, even when the combination weigher carries out a high-speed-operation. In the case of n=2, a double shift operation takes place, while in the case of n=3, a triple shift operation takes place.

The combination calculation means may be configured to repeatedly perform a combination process in which combination calculation is performed based on the weights of the objects to be weighed which have been fed to the combination hoppers to determine one combination made up of the combination hoppers in which a combination weight value is within the allowable range with respect to the target weight value and to determine the combination as an optimal combination; and the combination calculation means may be configured to repeatedly perform the combination process n (plural number) times in such a manner that, the combination calculation is performed based on weights of objects to be weighed which have been fed to combination hoppers which do not make up of an optimal combination determined in a previous combination process, in a subsequent combination process, and may be configured to determine optimal combinations determined sequentially in the combination process performed repeatedly as the first discharge combination and the second discharge combination alternately; the control means may be configured to cause the combination hoppers making up of the first discharge combination and the combination hoppers making up of the second discharge combination to alternately discharge the objects to be weighed and to cause the first collecting hopper and the second collecting hopper to alternately discharge the objects to be weighed, based on the first discharge combination and the second discharge combination alternately determined by the combination calculation means; and wherein the objects to be weighed which have been discharged from the first collecting hopper and the objects to be weighed which have been discharged from the second collecting hopper may be fed to different packaging machine inlets.

In such a configuration, since the combination process can be performed n times and the objects to be weighed can be discharged to each of the two packaging machine inlets n/2 times within one operation cycle time (e.g., one weighing cycle time), the objects to be weighed can be discharged n times in total, and thus, productivity within a specified time period can be improved. In addition, since the objects to be weighed inside the combination hoppers are discharged to the inner chute and to the outer chute alternately for the respective discharges determined sequentially, that is, the objects to be weighed are discharged from the combination hoppers to the inner chute and to the outer chute n/2 times within one operation cycle time, a sufficient distance can be provided between the batches of the objects to be weighed which are discharged previously and the objects to be weighed which are discharged subsequently on each of the chutes, even when the combination weigher carries out a high-speed operation. In the case of n=2, double shift operation takes place, while in the case of n=3, triple shift operation takes place.

The combination calculation means may be configured to perform a combination process in which combination calculation is performed based on the weights of the objects to be weighed which have been fed to the combination hoppers to determine two combinations which do not include the same combination hoppers and in which combination weight values obtained in the combination calculation are within the allowable range with respect to the target weight value, one of the two combinations may be determined as the first discharge combination and the other of the two combinations is determined as the second discharge combination; wherein the control means may be configured to cause the combination hoppers making up of the first discharge combination and the combination hoppers making up of the second discharge combination which have been determined by the combination calculation means to discharge the objects to be weighed simultaneously, and to cause the first collecting hopper and the second collecting hopper to discharge the objects to be weighed simultaneously; and wherein the objects to be weighed which have been discharged from the first collecting hopper and the objects to be weighed which have been discharged from the second collecting hopper may be fed to different packaging machine inlets.

In such a configuration, since the objects to be weighed can be discharged once from each of the first and second collecting hoppers, within one operation cycle time (e.g., one weighing cycle time) which is a time taken from when two discharge combinations are determined until subsequent two discharge combinations are determined, productivity within a specified time period can be improved. In addition, since the objects to be weighed inside the combination hoppers making up of one of the two discharge combinations determined simultaneously are discharged to the inner chute and the objects to be weighed inside the combination hoppers making up of the other discharge combination are discharged to the outer chute, that is, the objects to be weighed are discharged from the combination hoppers to each of the inner chute and to the outer chute only once within one operation cycle time, a sufficient distance can be provided between the batches of the objects to be weighed which are discharged previously and the objects to be weighed which are discharged subsequently on each of the chutes, even when the combination weigher carries out a high-speed operation. Furthermore, since the two discharge combinations which will discharge the objects to be weighed within one operation cycle are determined simultaneously, weights of the objects to be weighed of all the combination hoppers can be used in the combination calculation for determining the two discharge combinations. As a result, combination weighing precision for the objects to be weighed which are discharged can be improved as a whole.

The combination hopper line may include two lines which are upper and lower combination hopper lines, combination hoppers forming the upper combination hopper line may be weighing hoppers which weigh weights of the objects to be weighed which have been fed to the weighing hoppers and combination hoppers forming the lower combination hopper line may be memory hoppers which are provided to respectively correspond to the weighing hoppers and are fed with the objects to be weighed which have been weighed in the weighing hoppers; wherein the weighing hoppers may be each configured to be able to discharge the objects to be weighed selectively to the corresponding memory hopper or to the outer chute, and the memory hopper may be configured to be able to discharge the objects to be weighed selectively to the inner chute or to the outer chute; and wherein the combination calculation means may be configured to determine a first discharge combination such that a weighing hopper and a corresponding memory hopper are included in the first discharge combination when the weighing hopper is selected to make up of the first discharge combination.

In such a configuration, since the weighing hoppers and the memory hoppers arranged at upper and lower positions are equipped as the combination hoppers, the number of weight values used in the combination calculation can be increased so that combination weighing precision can be improved, without increasing a diameter of a circular-arc shape formed by arrangement of the combination hoppers.

A weighing system of the present invention comprises a plurality of weighing units each of which includes a combination weigher according to claim 1, the plurality of weighing units being configured such that combination hopper lines corresponding to the plurality of weighing units are continuously arranged and combination hoppers corresponding to the plurality of weighing units are arranged in a circular shape.

In this case, there are provided P (P: plural number) combination hopper lines having P circular-arc shaped hopper lines into which a combination hopper group made up of a plurality of combination hoppers for discharging the objects to be weighed selectively in the inward direction which is toward a center of the circle shape formed by arrangement of the hoppers or in the outward direction which is the opposite direction thereof are divided, P inner chutes and P outer chutes disposed to respectively correspond to the combination hopper lines, P first collecting hoppers provided at discharge outlets of the inner chutes and P second collecting hoppers provided at discharge outlets of the outer chutes. Each weighing unit may be configured to include combination calculation means and control means in addition to the combination hopper line, the inner chute, the outer chute, the first collecting hopper, and the second collecting hopper which are associated with each other. In this case, the combination calculation means of the respective weighing units may be integrated into one combination calculation means. Also, control means of the respective weighing units may be integrated into one control means.

In the weighing system of the present invention, a plurality of combination weighers (weighing units) of the present invention are equipped, and therefore advantages similar to those of the combination weigher of the present invention are achieved in each weighing unit.

Combination calculation means in each of the weighing units may be configured to repeatedly perform a combination process in which combination calculation is performed based on the weights of the objects to be weighed which have been fed to the combination hoppers within the weighing unit to determine one combination made up of combination hoppers in which a combination weight value is within an allowable range with respect to a target weight value and to determine the combination as an optimal combination; and the combination calculation means in each of the weighing units may be configured to repeatedly perform the combination process n (plural number) times in such a manner that, the combination calculation is performed based on weights of objects to be weighed which have been fed to combination hoppers which do not make up of an optimal combination determined in a previous combination process, in a subsequent combination process, and may be configured to determine optimal combinations determined sequentially in the combination process performed repeatedly as the first discharge combination and the second discharge combination alternately; the control means in each of the weighing units may be configured to cause the combination hoppers making up of the first discharge combination and the combination hoppers making up of the second discharge combination to alternately discharge the objects to be weighed and to cause the first collecting hopper and the second collecting hopper within the weighing unit to alternately discharge the objects to be weighed, based on the first discharge combination and the second discharge combination alternately determined by the combination calculation means within the weighing unit; and the objects to be weighed which have been discharged from the first collecting hopper and from the second collecting hopper belonging to the same weighing unit may be fed to the packaging machine inlet, and the objects to be weighed which have been discharged from the first collecting hopper and from the second collecting hopper belonging to different weighing units are fed to different packaging machine inlets.

In such a configuration, since the combination process can be performed n times and the objects to be weighed can be discharged to the same packaging machine inlet n times within one operation cycle time (e.g., one weighing cycle time) in each weighing unit, productivity (the number of times the objects to be weighed are discharged from the combination weigher to the packaging machine) within a specified time period can be improved. In addition, since the objects to be weighed inside the combination hoppers are discharged to the inner chute and to the outer chute alternately for the respective discharge combinations determined sequentially, that is, the objects to be weighed are discharged from the combination hoppers to the inner chute and to the outer chute only n/2 times within one operation cycle time, a sufficient distance can be provided between the batches of the objects to be weighed which are discharged previously and the objects to be weighed which are discharged subsequently on each of the chutes, even when the combination weigher carries out a high-speed operation. In the case of n=2, the double shift operation takes place, while in the case of n=3, the triple shift operation takes place.

A total number of the weighing units may be an even number. The combination calculation means in each of the weighing units may be configured to perform a combination process in which combination calculation is performed based on the weights of the objects to be weighed which have been fed to the combination hoppers within the weighing unit to determine two combinations which do not include the same combination hoppers and in which combination measured values obtained in the combination calculation are within an allowable range with respect to a target weight value and to determine the two combinations as the first discharge combination and the second discharge combination; wherein the control means in each of the weighing units may be configured to perform an internal discharge process for causing the combination hoppers making up of the first discharge combination determined by the combination calculation means within the weighing unit and the combination hoppers making up of the second discharge combination determined by the combination calculation means to discharge the objects to be weighed simultaneously, and an external discharge process for causing the first collecting hopper and the second collecting hopper to discharge the objects to be weighed simultaneously; wherein two weighing units including combination hopper lines arranged adjacent each other may be predetermined as a pair unit, the objects to be weighed which have been discharged from one of the first collecting hopper and the second collecting hopper of the weighing units forming the pair unit are fed to one of a pair of packaging machine inlets corresponding to the pair unit, and the objects to be weighed which have been discharged from the other collecting hopper are fed to the other packaging machine inlet; and wherein each of the weighing units may be configured to repeatedly perform a series of processes including the combination process, the internal discharge process and the external discharge process, with a time difference of substantially ½ of one operation cycle time that lapses from when an external discharge process in the weighing unit is terminated until a subsequent external discharge process in the weighing unit starts, between the two weighing units forming the pair unit.

In such a configuration, since the objects to be weighed can be discharged once from each of the first and second collecting hoppers, within one operation cycle time (e.g., one weighing cycle time) in each weighing unit, productivity within a specified time period can be improved. In addition, the objects to be weighed can be fed twice within one operation cycle time to each of the two packaging machine inlets respectively corresponding to the two weighing units of the pair unit, the weighing system is able to be adapted to the packaging machine operated at a high speed. Furthermore, since the objects to be weighed inside the combination hoppers making up of one of the two discharge combinations determined simultaneously are discharged to the inner chute and the objects to be weighed inside the combination hoppers making up of the other discharge combination are discharged to the outer chute in each weighing unit, that is, the objects to be weighed are discharged once from the combination hoppers to the inner chute and to the outer chute within one operation cycle time, a sufficient distance can be provided between the batches of the objects to be weighed which are discharged previously and the objects to be weighed which are discharged subsequently on each of the chutes, even when the combination weigher carries out a high-speed operation. Moreover, since the two discharge combinations which will discharge the objects to be weighed within one operation cycle time are determined simultaneously, the weights of the objects to be weighed of all the combination hoppers within each weighing unit can be used in the combination calculation for determining two discharge combinations. As a result, combination weighing precision for the objects to be weighed which are discharged can be improved as a whole.

The combination calculation means in each of the weighing units may be configured to perform a first process in which the combination calculation is performed based on the weights of the objects to be weighed which have been fed to the combination hoppers within the weighing unit to determine, as optimal combinations, combinations made up of combination hoppers in which combination weight values are within the allowable range with respect to the target weight value, and to determine optimal combination sets each of which is formed by combining two optimal combinations which do not include the same combination hoppers; and a second process in which for each of the optimal combination sets, a total of absolute values of differences between combination weight values of the optimal combinations included in the optimal combination set and the target weight value are calculated to select one optimal combination set in which the total of the absolute values of the differences is smallest, and one of two optimal combinations included in the selected optimal combination set is determined as the first discharge combination and the other optimal combination is determined as the second discharge combination.

In such a configuration, combination weighing precision for the objects to be weighed which are discharged from the combination hoppers making up of the respective discharge combinations can be improved as a whole.

The combination calculation means in each of the weighing units may be configured to perform a first process in which the combination calculation is performed based on weights of the objects to be weighed which have been fed to the combination hoppers within the weighing unit to determine, as allowable combinations, combinations made up of combination hoppers in which combination weight values are within the allowable range with respect to the target weight value, m (m: plural number) allowable combinations are selected, as first optimal combinations, from the allowable combinations, by giving priority to allowable combinations in which absolute values of differences between combination weight values and the target weight value are smaller, one allowable combination is selected as a second optimal combination from allowable combinations made up of combination hoppers obtained by excluding the combination hoppers belonging to each of the first optimal combinations, and m optimal combination sets each of which is made up of corresponding first and second optimal combinations are determined; and a second process in which for each of the optimal combination sets, a total of absolute values of differences between combination weight values of the first and second optimal combinations and the target weight value is calculated to select one optimal combination set in which the total of the absolute values of the differences is smallest, one of the first and second optimal combinations included in the selected optimal combination is determined as the first discharge combination and the other of the first and second optimal combinations is determined as the second discharge combination.

In such a configuration, combination weighing precision for the objects to be weighed which are discharged from the combination hoppers making up of the respective discharge combinations can be improved as a whole.

The combination calculation means in each of the weighing units may be configured to perform the combination calculation based on the weights of the objects to be weighed which have been fed to the combination hoppers within the weighing unit to determine, as allowable combinations, combinations made up of the combination hoppers in which combination weight values are within the allowable range with respect to the target weight value, to select as a first optimal combination one allowable combination in which an absolute value of difference between a combination weight value and the target weight value is smallest, from the allowable combinations, to select one allowable combination as a second optimal combination from allowable combinations made up of combination hoppers obtained by excluding the combination hoppers belonging to the first optimal combination, by giving priority to allowable combinations in which absolute values of differences between combination weight values and the target weight value are smaller, and to determine that one of the first and second optimal combinations is the first discharge combination and the other of the first and second optimal combinations is the second discharge combination.

In such a configuration, combination weighing precision for the objects to be weighed which are discharged from the combination hoppers making up of the respective discharge combinations can be improved as a whole.

The combination calculation means in each of the weighing units may be configured to perform a combination process in which combination calculation is performed based on the weights of the objects to be weighed which have been fed to the combination hoppers within the weighing unit to determine two combinations which do not include the same combination hoppers and in which combination weight values obtained in the combination calculation are within the allowable range with respect to the target weight value, one of the two combinations is determined as the first discharge combination and the other of the two combinations is determined as the second discharge combination; wherein the control means in each of the weighing units may be configured to perform an internal discharge process for causing the combination hoppers making up of the first discharge combination determined by the combination calculation means within the weighing unit and the combination hoppers making up of the second discharge combination determined by the combination calculation means to discharge the objects to be weighed simultaneously, and an external discharge process for causing the first collecting hopper and the second collecting hopper to discharge the objects to be weighed simultaneously; and wherein the plurality of weighing units may be configured to perform a series of processes including the combination process, the internal discharge process and the external discharge process at the same timings, and to feed the objects to be weighed which have been discharged simultaneously from the first collecting hopper and from the second collecting hopper of the plurality of weighing units to different packaging machine inlets.

In such a configuration, since the objects to be weighed can be discharged once from the first and second collecting hoppers of the plurality of weighing units within one operation cycle time (e.g., one weighing cycle time), productivity within a specified time period can be improved. For example, in cases where k (k: plural number) weighing units are equipped, the objects to be weighed can be fed simultaneously into (2×k) packaging machine inlets within one operation cycle time, the weighing system is able to be adapted to a packaging machine which packages (2×k) sets of objects to be weighed simultaneously. In addition, since the objects to be weighed inside the combination hoppers making up of one of the two discharge combinations determined simultaneously are discharged to the inner chute and the objects to be weighed inside the combination hoppers making up of the other discharge combination are discharged to the outer chute in each weighing unit, that is, the objects to be weighed are discharged from the combination hoppers to the inner chute and to the outer chute once within one operation cycle time, in each weighing unit, a sufficient distance can be provided between the batches of the objects to be weighed which are discharged previously and the objects to be weighed which are discharged subsequently on each of the chutes, even when the weighing system carries out a high-speed operation. Furthermore, since the two discharge combinations which will discharge the objects to be weighed within one operation cycle time are determined simultaneously, weights of the objects to be weighed of all the combination hoppers within the respective weighing units can be used in the combination calculation for determining the two discharge combinations. As a result, combination weighing precision for the objects to be weighed which are discharged can be improved as a whole.

The combination hopper line of the plurality of weighing units may include two lines which are upper and lower combination hopper lines, combination hoppers forming the upper combination hopper line are weighing hoppers which weigh weights of the objects to be weighed which have been fed to the weighing hoppers, combination hoppers forming the lower combination hopper line are memory hoppers which are provided to respectively correspond to the weighing hoppers and are fed with the objects to be weighed which have been weighed in the weighing hoppers; the weighing hoppers may be each configured to be able to discharge the objects to be weighed selectively to the corresponding memory hopper or to the outer chute, and the memory hoppers may be each configured to be able to discharge the objects to be weighed selectively to the inner chute or to the outer chute; and wherein the combination calculation means in each of the weighing units is configured to determine a first discharge combination such that a weighing hopper and a corresponding memory hopper are included in the first discharge combination when the weighing hopper is selected to make up of the first discharge combination.

In such a configuration, since the weighing hoppers and the memory hoppers arranged at upper and lower positions are equipped as the combination hoppers, the number of weight values used in the combination calculation can be increased so that combination weighing precision can be improved, without increasing a diameter of the circular shape formed by arrangement of the combination hoppers.

Effects of the Invention

The present invention has the above described configuration, and provides a combination weigher and a weighing system which are equipped with collecting chutes with a relatively simple structure and are capable of operating at a high speed irrespective of characteristics of almost all the objects to be weighed.

The above and further objects, features and advantages of the present invention will more fully be apparent from the following detailed description of preferred embodiments with accompanying drawings.

BRIEF DESCRIPTION OF THE DRAWINGS

FIG. 1(b) is a schematic view of collecting chutes, weighing hoppers, and memory hoppers of the combination weigher as viewed from above, and FIG. 1(c) is a schematic view of lower chutes of the combination weigher as viewed from above;

FIG. 4(b) is a schematic view of a lower chute of the combination weigher as viewed from above;

FIG. 5(b) is a schematic view of collecting chutes, weighing hoppers, and memory hoppers of the combination weigher as viewed from above, and FIG. 5(c) is a schematic view of the lower chute of the combination weigher as viewed from above;

FIG. 9(b) is a schematic view of a lower chute of the combination weigher as viewed from above;

Figure 1:
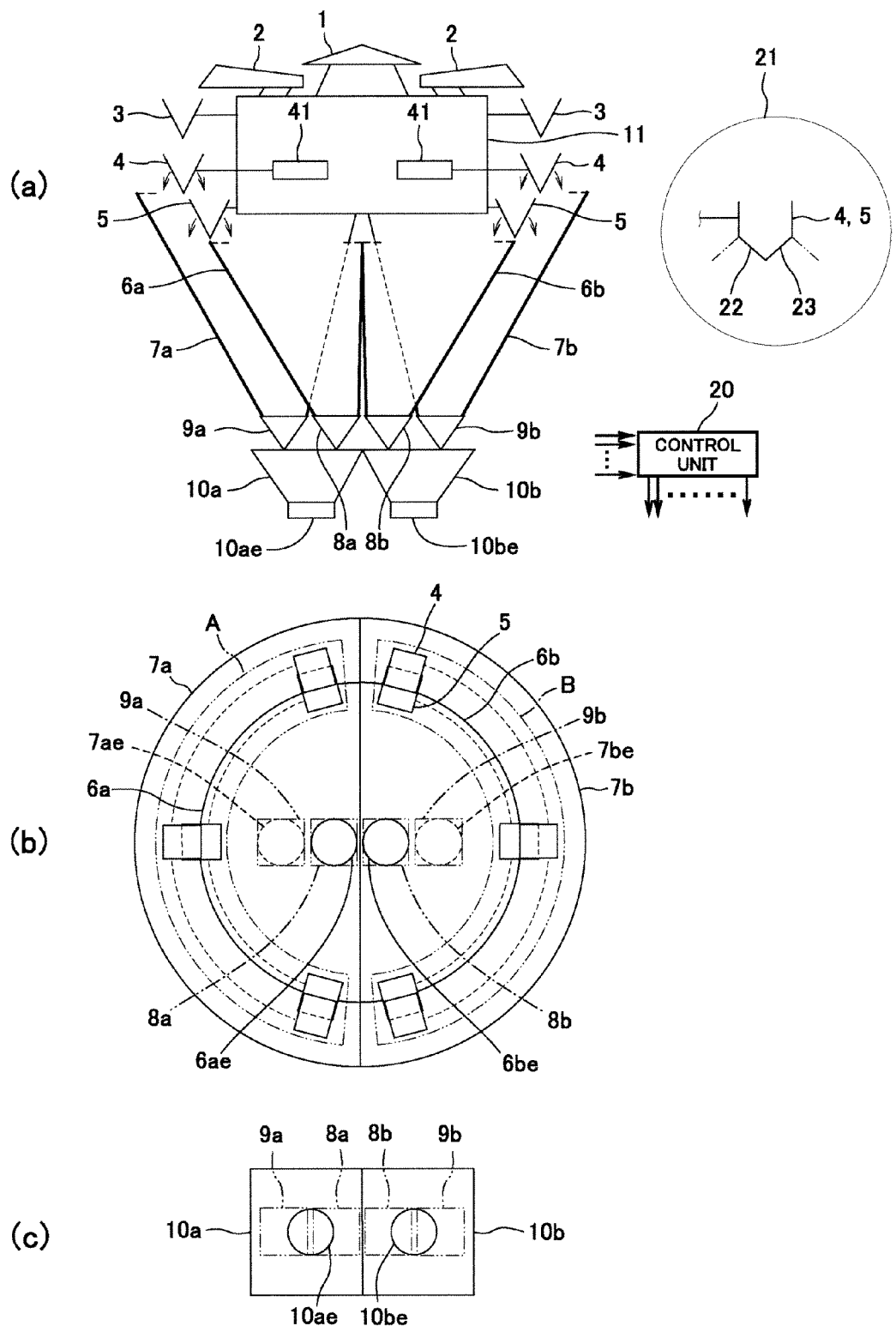
FIG. 1 (a) is a schematic partial cross-sectional view of a combination weigher according to an example 1 of an embodiment 1 of the present invention, as viewed from laterally.

DESCRIPTION OF REFERENCE NUMERALS 1 dispersion feeder
2 linear feeder
3 feeding hopper
4 weighing hopper
5 memory hopper
6a, 6b, 6c, 6d inner chute
7a, 7b, 7c, 7d outer chute
8a, 8b, 8c, 8d inner chute collecting hopper
9a, 9b, 9c, 9d outer chute collecting hopper
10a, 10b, 10c, 10d lower chute
11 center base body
20 control unit

BEST MODE FOR CARRYING OUT THE INVENTION

Hereinafter, preferred embodiments of the present invention will be described with reference to the drawings.

Embodiment 1

Example 1 of Embodiment 1

FIG. 1 (a) is a schematic partial cross-sectional view of a combination weigher (weighing system) according to an example 1 of an embodiment 1 of the present invention, as viewed from laterally, FIG. 1(*b*) is a schematic view of collecting chutes (inner chutes and outer chutes), weighing hoppers, and memory hoppers of the combination weigher as viewed from above, and FIG. 1(*c*) is a schematic view of a lower chute of the combination weigher as viewed from above.

As shown in FIG. 1(*a*), the combination weigher is constructed in such a manner that a center base body (body) 11 is disposed at a center of the combination weigher and supported by four legs (not shown), and a dispersion feeder 1 having a conical shape is mounted to an upper part of the center base body 11 to radially disperse objects to be weighed supplied from an external supplying device by vibration. Around the dispersion feeder 1, a plurality of linear feeders 2 are provided to transfer the objects to be weighed sent from the dispersion feeder 1 into respective feeding hoppers 3 by vibration. A plurality of feeding hoppers 3, a plurality of weighing hoppers 4 and a plurality of memory hoppers 5 are disposed below the linear feeders 2 and are arranged in a circular shape around the center base body 11 in such a manner that each feeding hopper 3, each weighing hopper 4, and each memory hopper 5 correspond to the associated one of the linear feeders 2. The dispersion feeder 1, the linear feeders 2, the feeding hoppers 3, the weighing hoppers 4 and the memory hoppers 5 are mounted to the center base body 11. Inside the center base body 11, drive units therefor (vibration device for the dispersion feeder 1 and the linear feeders 2, gate opening and closing devices for the feeding hoppers 3, the weighing hoppers 4 and the memory hoppers 5, etc) are accommodated. Each weighing hopper 4 is attached with a weight sensor 41 such as a load cell which measures a weight of the objects to be weighed inside the weighing hopper 4. The weight sensors 41 are accommodated inside the center base body 11 along with the drive units. Each weight sensor 41 outputs a measured value to a control unit 20. Each memory hopper 5 is disposed below and in an inward direction of the corresponding weighing hopper 4. When the memory hopper 5 becomes empty, the weighing hopper 4 feeds the objects to be weighed to the memory hopper 5. The inward direction refers to a direction toward a center of a circle shape formed by arrangement of the weighing hoppers 4 and the memory hoppers 5, and its opposite direction refers to an outward direction. Below the memory hoppers 5 arranged in the circular shape, two inner chutes 6*a* and 6*b* formed by dividing in two a chute of a substantially inverted cone frustum shape are disposed, and outer chutes 7*a* and 7*b* are disposed along outside of the inner chutes 6*a* and 6*b* to respectively correspond to the inner chutes 6*a* and 6*b*.

Each weighing hopper 4 is provided with two gates (not shown) to be able to selectively discharge the objects to be weighed to the corresponding memory hopper 5 or to the outer chute 7*a* or 7*b* located therebelow. To be more specific, each weighing hopper 4 is provided with the gate (hereinafter referred to as "inner gate") for discharging the objects to be weighed to the memory hopper 5 and the gate (hereinafter referred to as "outer gate") for discharging the objects to be weighed to the outer chute 7*a* or 7*b*. Each memory hopper 5 is provided with two gates (not shown) to be able to selectively discharge the objects to be weighed to the inner chute 6*a* or 6*b* or to the outer chute 7*a* or 7*b* located therebelow. To be more specific, each memory hopper 5 is provided with the gate (hereinafter referred to as "inner gate" for discharging the objects to be weighed to the inner chute 6*a* or 6*a* and the gate (hereinafter referred to as "outer gate") for discharging the objects to be weighed to the outer chute 7*a* or 7*b*. In FIG. 1(*a*), within a circle 21, the substantially actual shapes of the weighing hopper 4 and the memory hopper 5 are schematically shown, and the shapes of the inner gate 22 and the outer gate 23 are schematically shown.

In the example 1, all the weighing hoppers 4 and memory hoppers 5 arranged in a circular shape are divided into two groups A and B, and the two inner chutes 6*a* and 6*b* are provided to respectively correspond to the two groups A and B, and the two outer chutes 7*a* and 7*b* are provided to respectively correspond to the two groups A and B. The inner chutes 6*a* and 6*b* have upper ends a circular-arc shape to conform to the shape (circular-arc shape) formed by arrangement of the hoppers of the corresponding groups A and B. Discharge outlets 6*ae* and 6*be* are provided at bottom parts of the inner chutes 6*a* and 6*b* which are closer to the center of the circular-arc shape. Collecting hoppers 8*a* and 8*b* are provided at the bottom part discharge outlets 6*ae* and 6*be*, respectively to hold and discharge the objects to be weighed. The outer chutes 7*a* and 7*b* disposed along the outside of the inner chutes 6*a* and 6*b* have upper edges of a circular-arc shape. Discharge outlets 7*ae* and 7*be* are provided at bottom parts of the outer chutes 7*a* and 7*b* which are closer to the center of the circular-arc shape. Collecting hoppers 9*a* and 9*b* are provided at the bottom part discharge outlets 7*ae* and 7*be*, respectively to hold and discharge the objects to be weighed.

A first combination weigher unit includes the weighing hoppers 4 and the memory hoppers 5 in the group A, the linear feeder 2, the feeding hopper 3, the inner chute 6*a*, the outer chute 7*a* and the collecting hoppers 8*a* and 9*a* disposed to correspond to the group A. A second combination weigher unit includes the weighing hoppers 4 and the memory hoppers 5 in the group B, the linear feeder 2, the feeding hopper 3, the inner chute 6*b*, the outer chute 7*b* and the collecting hoppers 8*b* and 9*b* disposed to correspond to the group B.

Below the collecting hoppers 8*a* and 9*a* of the first combination weigher unit, a lower chute 10*a* is disposed to receive the objects to be weighed which have been discharged from the collecting hoppers 8*a* or 9*a* and discharge them from a bottom part discharge outlet 10*ae*. Likewise, below the collecting hoppers 8*b* and 9*b* of the second combination weigher unit, a lower chute 10*b* is disposed to receive the objects to be weighed which have been discharged from the collecting hoppers 8*b* or 9*b* and discharge them from a bottom part discharge outlet 10*be*.

Below the lower chutes 10*a* and 10*b* of the combination weigher, two packaging machines (not shown) or a twin-inlet packaging machine (not shown) having two inlets into which the objects to be weighed are fed are disposed. The objects to be weighed which have been discharged from the discharge outlet 10*ae* of the lower chute 10*a* and from the discharge outlet 10*be* of the lower chute 10*b* are respectively fed into different packaging machine inlets (first and second packaging machine inlets) and are charged into package bags for packaging. Thus, in the present example, the objects to be weighed which have been discharged from the collecting hoppers 8*a* or 9*a* in the first combination weigher unit are fed into the first packaging machine inlet through the lower chute 10*a*, and the objects to be weighed which have been discharged from the collecting hoppers 8*b* or 9*b* in the second combination weigher unit are fed into the second packaging machine inlet through the lower chute 10*b*.

In the present example, the control unit 20 controls the first combination weigher unit and the second combination weigher unit so that each of the first combination weigher unit and the second combination weigher unit operates as a single combination weigher.

The control unit 20 includes a control means and a combination calculation means for each combination weigher unit to control the operation of the entire combination weigher and to perform a combination process to determine a combination (discharge combination) made up of the weighing hoppers 4 and the memory hoppers 5 which will discharge the objects to be weighed, for each of the first and second combination weigher units. In the combination process, the combination calculation is performed based on measured values (measured values obtained using the weight sensors 41) of the weights of the objects to be weighed inside the weighing hoppers 4 and the memory hoppers 5 to determine one combination made up of the weighing hoppers 4 and the memory hoppers 5 in which a combination measured value (=combination weight value) which is a total of the measured values is within an allowable range (predetermined weight range) with respect to a target weight value to determine it as an optimal combination. The measured values of the objects to be weighed inside the memory hopper 5 for use in this combination process are measured values obtained using the weight sensors 41 in the weighing hoppers 4 located thereabove. If the number of combinations in which the measured values are within the allowable range with respect to the target weight value is plural, a combination in which, for example, a total measured value (combination measured value) is closest to the target weight value (or a combination whose measured value coincides with the target weight value, if any), i.e., a combination in which an absolute value of a difference between the total measured value and the target weight value is smallest, is determined as an optimal combination. In the embodiment 1, the optimal combination is a discharge combination. In the combination weigher, the target weight value and the allowable range with respect to the target weight value are predetermined. The allowable range is determined such that the target weight value is a lower limit value and a value larger than the target weight value is an upper limit value, for example. By way of example, when the target weight value is set to 400 g, the lower limit value of the allowable range is set to 400 g which is equal to the target weight value, and the upper limit value of the allowable range is set to 420 g which is larger than the target weight value. Alternatively, the allowable range may be determined such that a value smaller than the target weight value is set as the lower limit value and the upper limit value is not set (In this case, the upper limit value may be assumed to be infinite). In cases where the allowable rage with respect to the target weight value is set to a range which is not smaller than the target weight value, that is, the lower limit value of the allowable range is set to a value equal to the target weight value, an absolute value of a difference between the combination measured value which is a total of the measured values of the optimal combinations and the target weight value is equal to a value (difference) obtained by subtracting the target weight value from the combination measured value.

Hereinafter, the weighing hoppers 4 and the memory hoppers 5 are collectively referred to as combination hoppers 4 and 5 when they are not distinguished from each other.

An outline of the operation of the combination weigher configured as described above will be first described.

The objects to be weighed are supplied from the external supplying device to the dispersion feeder 1. The dispersion feeder 1 feeds the objects to be weighed to the feeding hopper 3 through the linear feeder 2. The feeding hopper 3 feeds the objects to be weighed to the weighing hopper 4. The weight sensor 41 measures the weight of the objects to be weighed which have been fed into the weighing hopper 4, and sends the measured value to the control unit 20. The objects to be weighed whose weight has been measured in the weighing hopper 4 are supplied to the memory hopper 5 located therebelow if the memory hopper 5 is empty. The above described combination process is performed for each combination weigher unit to determine the discharge combinations (optimal combinations). Then, the combination hoppers 4 and 5 selected to make up of the discharge combination discharge the objects to be weighed. When the objects to be weighed are held in the weighing hopper 4 located above the memory hopper 5 which is empty, the weighing hopper 4 feeds the objects to be weighed to the memory hopper 5. The feeding hopper 3 feeds the objects to be weighed to the weighing hopper 4 which is empty. The linear feeder 2 feeds the objects to be weighed to the feeding hopper 3 which is empty.

In present embodiment, the combination process is performed sequentially for each combination weigher unit, and the combination hoppers 4 and 5 selected to make up of the discharge combinations discharge the objects to be weighed. A discharge direction in which the combination hoppers 4 and 5 discharge the objects to be weighed is switched for each discharge combination determined in the combination process. To be more specific, the combination hoppers 4 and 5 discharge the objects to be weighed alternately to the inner chutes 6a or 6b and to the outer chute 7a or 7b for respective of discharge combinations sequentially determined. According to the discharge, the inner chute collecting hopper 8a or 8b and the outer chute collecting hoppers 9a or 9b alternately discharge the objects to be weighed. For example, when the combination process is repeated for the first combination weigher unit, the combination hoppers 4 and 5 determined in respective combination processes discharge the objects to be weighed alternately to the inner chute 6a and to the outer chute 7a. In the combination process for determining the discharge combination for discharging the objects to be weighed to the inner chute 6a, the weighing hopper 4 is selected to make up of the discharge combination only when the corresponding memory hopper 5 disposed therebelow is selected together. In this case, the weighing hopper 4 and the memory hopper 5 open their inner gates to discharge the objects to be weighed in such a manner that the objects to be weighed are discharged from the weighing hopper 4 to the inner chute 6a through the inside of the memory hopper 5. In the combination process for determining the discharge combination for discharging the objects to be weighed to the inner chute 6a, the memory hopper 5 can be selected freely to make up of the discharge combination. In the combination process for determining the discharge combination for discharging the objects to be weighed to the outer chute 6a, the weighing hopper 4 and the memory hopper 5 can be selected freely to make up of the discharge combination. The same applies to the second combination weigher unit.

Subsequently, an operation of the first and second combination weigher units which takes place when the first and second combination weigher units are configured to carry out the double shift operation will be described in detail. In the double shift operation, by setting the number of weighing hoppers 4 and the number of memory hoppers 5 to nine or ten in each of the groups A and B, and by setting the number of the combination hoppers 4 and 5 which will be selected in the combination process (the number of combination hoppers 4 and 5 which will be selected to make up of the optimal combination) to four in each of the groups A and B, high combination weighing precision is obtained. The phrase "the number of combination hoppers 4 and 5 which will be selected in the combination process is set to four" means that the linear feeder 2 and others are configured to operate so that a target feed amount of the objects to be weighed which are fed from each feeding hopper 3 to the weighing hopper 4 once becomes substantially ¼ of a target weight value.

Figure 2:
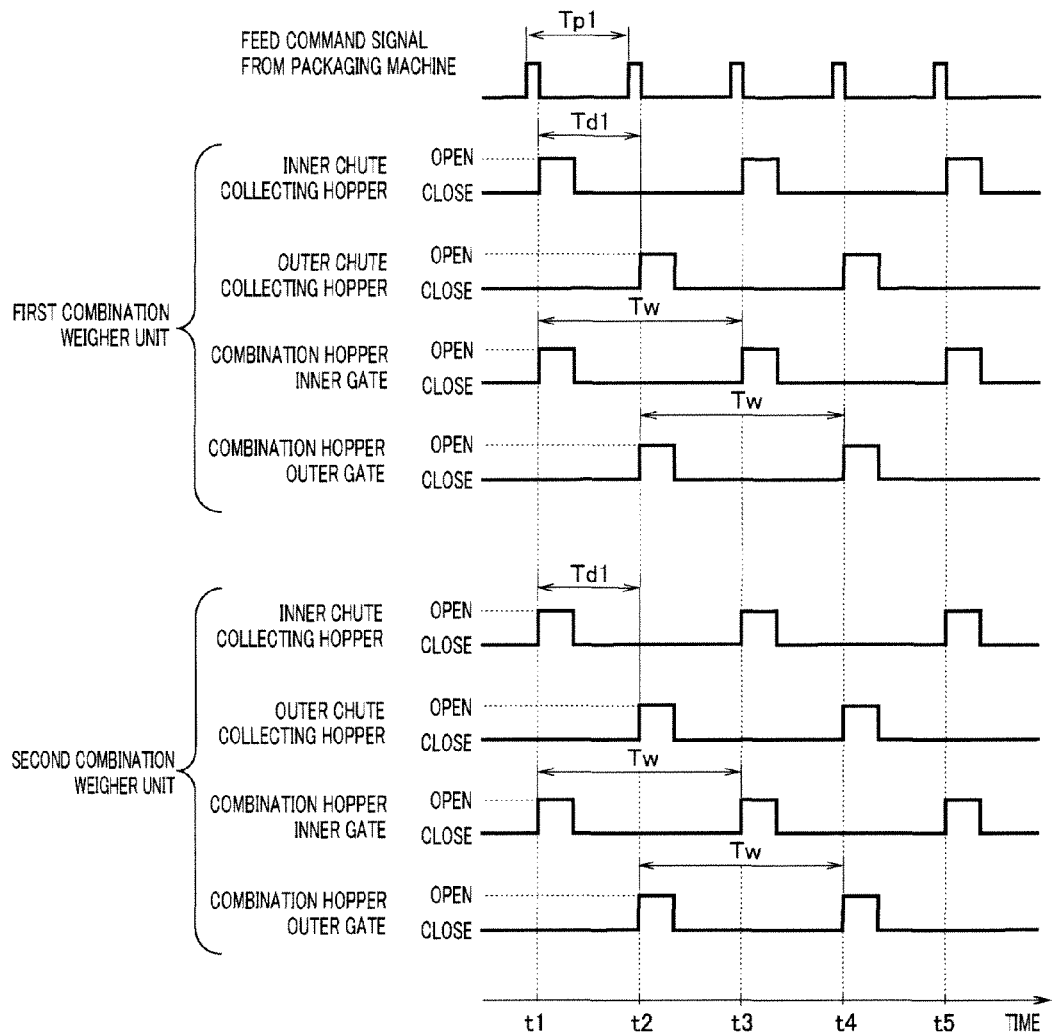
FIG. 2 is a timing chart showing a double shift operation of the combination weigher of the example 1 of the embodiment 1 of the present invention.

FIG. 2 is a timing chart showing the double shift operation carried out by each combination weigher unit in the combination weigher according to the example 1 of present embodiment.

One operation cycle time Tw in each combination weigher unit is, for example, a time period taken to accomplish a procedure in which immediately after a discharge combination has been determined in a combination process in a previous operation cycle, weighing hoppers 4 selected to make up of the discharge combination (when these weighing hoppers 4 are selected to make up of the discharge combination) discharge the objects to be weighed, the objects to be weighed are subsequently fed to these weighing hoppers 4 making up of the discharge combination, time for stabilizing the weight sensors 41 lapses, the weight sensors 41 measure the weights of the objects to be weighed inside these weighing hoppers 4, and thereafter a combination process is performed to determine a discharge combination. One weighing cycle time is, for example, a time period taken to accomplish a procedure in which weighing hoppers 4 selected to make up of a discharge combination determined in a combination process in a previous operation cycle (when these weighing hoppers 4 are selected to make up of the discharge combination), start to discharge the objects to be weighed, the objects to be weighed are subsequently fed to these weighing hoppers 4 making up of the discharge combination, time for stabilizing the weight sensors 41 lapses, the weight sensors 41 measure the weights of the objects to be weighed inside these weighing hopper 4, and thereafter a combination process is performed to determine a discharge combination. Therefore, one weighing cycle time is equal to one operation cycle time Tw in a case where an allowance time, a wait time, etc, which lapses from when a discharge combination is determined in a combination process until hoppers selected to make up of the discharge combination start to discharge the objects to be weighed is zero. It is desired that one operation cycle time Tw be equal to one weighing cycle time to make the combination weigher carry out a high-speed operation. Therefore, in present embodiment, the one operation cycle time Tw is set equal to or substantially equal to one weighing cycle time.

The double shift operation in each combination weigher unit is carried out in such a manner that a combination process is performed once in every Tw/2 time and combination hoppers 4 and 5 making up of an optimal combination selected in the combination process discharge the objects to be weighed. The combination process in the double shift operation is performed in such a manner that combination calculation is performed using measured values (weight values) of the objects to be weighed of the combination hoppers 4 and 5 holding the objects to be weighed whose weight values have been measured by the weight sensors 41 in each combination weigher unit to select one combination made up of the combination hoppers 4 and 5 in which a total measured value is within a specified weight range and to determine it as an optimal combination, and measured values of all the combination hoppers 4 and 5 are used in combination calculation in two continuous combination processes. In each combination weigher unit, the combination hoppers 4 and 5 making up of optimal combinations sequentially selected resulting from the combination processes repeated once in every Tw/2 time discharge the objects to be weighed alternately to the inner chute 6a or 6b and to the outer chute 7a or 7b for respective of the optimal combinations, and according to the discharge, the collecting hopper 8a or 8b and the collecting hopper 9a and 9b alternately discharge the objects to be weighed. Thereby, the objects to be weighed are discharged from each combination weigher unit to the packaging machine twice within one operation cycle time Tw. In this case, one discharge cycle time Td1 for each combination weigher unit is equal to ½ of one operation cycle time Tw. One discharge cycle time Td1 is equal to one packaging cycle time Tp1 for the packaging machine. Whereas the measured values of all the combination hoppers 4 and 5 in each combination weigher unit are used in combination calculation in two continuous combination processes, the measured values of all the combination hoppers 4 and 5 are not necessarily used. For example, in cases where the total number of the combination hoppers 4 and 5 is large in each combination weight unit, the measured values of all the combination hoppers 4 and 5 are sometimes not used in combination calculation in two continuous combination processes, if the number of measured values used is limited in one combination calculation, that is, the number is predetermined.

Receiving, for example, a feed command signal from the packaging machine, as an input, the control unit 20 causes the inner chute collecting hopper 8a or 8b to open its gates to discharge the objects to be weighed to the packaging machine in response to the feed command signal (time t1). And, the control unit 20 causes the combination hoppers 4 and 5 selected to make up of the optimal combinations to open their inner gates based on the operation timing of the gate of the collecting hopper 8a or 8b to discharge the objects to be weighed from the combination hoppers 4 and 5 to the inner chute 6a or 6b (time t1). Receiving a subsequent feed command signal as an input, the control unit 20 causes the outer chute collecting hopper 9a or 9b to open its gate to discharge the objects o be weighed to the packaging machine in response to the feed command signal (time t2). And, the control unit 20 causes the combination hoppers 4 and 5 selected to make up of the optimal combinations to open their outer gates based on the operation timing of the gate of the collecting hopper 9a or 9b to discharge the objects to be weighed from the combination hoppers 4 and 5 to the outer chute 7a or 7b (time t2). Then, receiving a subsequent feed command signal as an input, the control unit 20 causes the inner chute collecting hopper 8a or 8b to open its gate to discharge the objects to be weighed to the packaging machine in response to the feed command signal, and causes the combination hoppers 4 and 5 selected to make up of the optimal combinations to open their inner gates to discharge the objects to be weighed from the combination hoppers 4 and 5 to the inner chute 6a or 6b (time t3). Thereafter, the similar operation is repeated.

In the operation shown in FIG. 2, the objects to be weighed which have been discharged from the combination hoppers 4 and 5 by opening the inner gates at time t1 are gathered to and held in the inner chute collecting hopper 8a or 8b before time t3, and the collecting hopper 8a or 8b opens its gate to discharge the objects to be weighed to the packaging machine at time t3. Likewise, the objects to be weighed which have been discharged from the combination hoppers 4 and 5 by opening their outer gates at time t2 are gathered to and held in the outer chute collecting hopper 9a or 9b before time t4, and the collecting hopper 9a or 9b opens its gate to discharge the objects to be weighed to the packaging machine at time t4.

As described above, the combination hoppers 4 and 5 making up of the optimal combinations discharge the objects to be weighed to the inner chute 6a or 6b and to the outer chute 7a or 7b alternately, and according to the discharge, the inner chute collecting hopper 8a or 8b and the outer chute collecting hopper 9a or 9b alternately discharge the objects to be weighed to the packaging machine. Whereas in the operation of FIG. 2, the opening and closing timings of the gate of the collecting hopper 8a or 8b are the same as the opening and closing timings of the inner gates of the combination hoppers 4 and 5 and the opening and closing timings of the gate of the collecting hopper 9a or 9b are the same as the opening and closing timings of the outer gates of the combination hoppers 4 and 5, these are merely exemplary. For example, the control unit 20 may control the opening and closing timings of the gates of the combination hoppers 4 and 5 based on the opening and closing timings of the gates of the collecting hoppers 8a, 8b, 9a and 9b to make the opening and closing timings of the gates different.

By causing each combination weigher unit to perform the double shift operation as described above, each combination weigher unit is able to discharge the objects to be weighed to the packaging machine once in every Tw/2 time at a speed twice as high as that of the single shift operation. This makes it possible to improve productivity (the total number of times the combination weigher discharges the objects to be weighed to the packaging machine) within a specified time period, and thus to adapt the combination weigher to the packaging machine operated at a high speed.

Subsequently, an operation of each combination weigher unit taking place when the combination weigher unit is configured to carry out a triple shift operation will be described in detail. In the triple shift operation, by setting the number of weighing hoppers 4 and the number of memory hoppers 5 respectively to eleven or twelve in each of the groups A and B, and by setting the number of the combination hoppers 4 and 5 which will be selected in the combination process to four in each of the groups A and B, high combination weighing precision is obtained.

Figure 3:
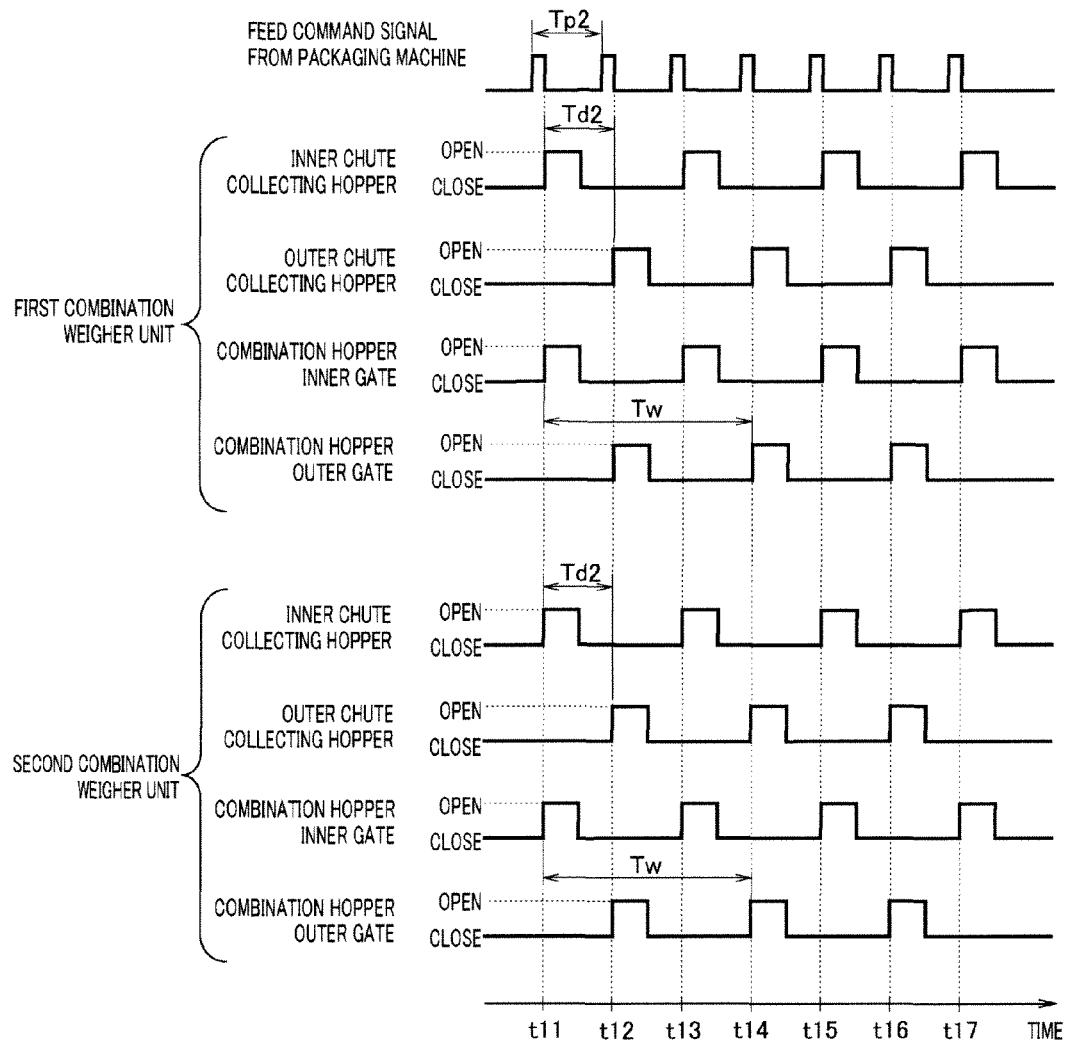
FIG. 3 is a timing chart showing a triple shift operation of the combination weigher of the example 1 of the embodiment 1 of the present invention.

FIG. 3 is a timing chart showing the triple shift operation carried out by each combination weigher unit in the combination weigher according to the example 1 of the present embodiment.

The triple shift operation in each combination weigher unit is carried out in such a manner that a combination process is performed once in every Tw/3 time and the combination hoppers 4 and 5 making up of an optimal combination selected in the combination process discharge the objects to be weighed. The combination process in the triple shift operation is performed in such a manner that for each combination weigher unit, combination calculation is carried out using measured values (weight values of the objects to be weighed) of the combination hoppers 4 and 5 holding the objects to be weighed whose weight values have been measured by the weight sensors 41 to select one combination made up of the combination hoppers 4 and 5 in which a total measured value is within a predetermined weight range and to determine it as an optimal combination, and measured values of all the combination hoppers 4 and 5 are used in combination calculation in three continuous combination processes. In each combination weigher unit, the combination hoppers 4 and 5 making up of optimal combinations sequentially selected resulting from repetitive combination processes performed once in every Tw/3 time discharge the objects to be weighed alternately to the inner chute 6a or 6b and to the outer chute 7a or 7b for respective of the optimal combinations, and according to the discharge, the collecting hopper 8a or 8b and the collecting hopper 9a or 9b alternately discharge the objects to be weighed. Thereby, the objects to be weighed are discharged from each combination weigher unit to the packaging machine three times within one operation cycle time Tw. In this case, one discharge cycle time Td2 for each combination weigher unit is equal to ⅓ of one operation cycle time Tw. One discharge cycle time Td2 is equal to one packaging cycle time Tp2 of the packaging machine. Whereas in each combination weigher unit, the measured values of all the combination hoppers 4 and 5 are used in combination calculation in three continuous combination processes, the measured values of all the combination hoppers 4 and 5 are not necessarily used. For example, in cases where the total number of the combination hoppers 4 and 5 is large in each combination weight unit, the measured values of all the combination hoppers 4 and 5 are sometimes not used in combination calculation in continuous three combination processes, if the number of measured values used in one combination calculation is limited, that is, the number is predetermined.

Receiving, for example, a feed command signal from the packaging machine, as an input, the control unit 20 causes the inner chute collecting hopper 8a or 8b to open its gate to discharge the objects to be weighed to the packaging machine in response to the feed command signal (time t11). And, the control unit 20 causes the combination hoppers 4 and 5 selected to make up of the optimal combinations to open their inner gates based on the operation timing of the gate of the collecting hopper 8a or 8b to discharge the objects to be weighed to the inner chutes 6a or 6b (time t11). Receiving a subsequent feed command signal as an input, the control unit 20 causes the outer chute collecting hopper 9a or 9b to open its gate to discharge the objects to be weighed to the packaging machine in response to the feed command signal (time t12). And, the control unit 20 causes the combination hoppers 4 and 5 selected to make up of the optimal combinations to open their outer gates based on the operation timing of the gate of the collecting hopper 9a or 9b to discharge the objects to be weighed to the outer chute 7a or 7b (time t12). Then, receiving a subsequent feed command signal as an input, the control unit 20 causes the inner chute collecting hopper 8a or 8b to open its gate to discharge the objects to be weighed to the packaging machine, and causes the combination hoppers 4 and 5 selected to make up of the optimal combinations to open their inner gates to discharge the objects to be weighed to the inner chute 6a or 6b, in response to the feed command signal (time t13). Thereafter, the similar operation is repeated.

In the operation shown in FIG. 3, the objects to be weighed which have been discharged from the combination hoppers 4 and 5 by opening their inner gates at time t11 are gathered to and held in the inner chute collecting hopper 8a or 8b before time t13, and the collecting hopper 8a or 8b opens its gate to discharge the objects to be weighed to the packaging machine at time t13. Likewise, the objects to be weighed which have been discharged from the combination hoppers 4 and 5 by opening the outer gates at time t12 are gathered to and held in the inner chute collecting hopper 9a or 9b before time t14, and the collecting hopper 9a or 9b opens its gate to discharge the objects to be weighed to the packaging machine at time t14.

As described above, the combination hoppers 4 and 5 selected to make up of the optimal combinations every time combination calculation is performed, discharge the objects to be weighed to the inner chute 6a or 6b and to the outer chute 7a or 7b alternately, and according to the discharge, the inner chute collecting hopper 8a or 8b and the outer chute collecting hopper 9a or 9b alternately discharge the objects to be weighed to the packaging machine. Whereas in the operation of FIG. 3, the opening and closing timings of the gate of the collecting hopper 8a or 8b are the same as the opening and closing timings of the inner gates of the combination hoppers 4 and 5 and the opening and closing timings of the gate of the collecting hopper 9a or 9b are the same as the opening and closing timings of the outer gates of the combination hoppers 4 and 5, these are merely exemplary. For example, the control unit 20 may control the opening and closing timings of the gates of the combination hoppers 4 and 5 based on the opening and closing timings of the gates of the collecting hopper 8a, 8b, 9a or 9b to make the opening and closing timings of the gates different.

By causing each combination weigher unit to perform the triple shift operation as described above, each combination weigher unit discharges the objects to be weighed to the packaging machine once in every Tw/3 time at a speed three times as high as that of the single shift operation. This makes it possible to improve productivity within a specified time period, and thus to adapt the combination weigher to the packaging machine operated at a high speed.

Whereas the control unit 20 executes control to cause the first and second combination weigher units to operate at same timings as illustrated in the timing charts of FIGS. 2 and 3, it may alternatively execute control to cause the first and second combination weigher units to operate at different timings. In this case, for example, the control unit 20 may be configured to receive a feed command signal corresponding to the first combination weigher unit as an input and a feed command signal corresponding to the second combination weigher unit as an input, from the packaging machine, and to control the operation of each combination weigher unit based on the associated feed command signal.

Since in the example 1, each combination weigher unit is configured in such a manner that the inner chute 6a or 6b is disposed to correspond to the group A or B of the combination hoppers 4 and 5 arranged in a circular-arc shape (semi-circular shape in the example 1) having a central angle of approximately 180 degrees or smaller, and the outer chute 7a or 7b is disposed along outside of the inner chute 6a or 6b, the collecting chutes (inner chute and outer chute) can be made to have a relatively simple structure, and the distance over which the objects to be weighed which have been discharged from the combination hoppers 4 and 5 to the inner chute 6a or 6b are transferred and the distance over which the objects to be weighed which have been discharged from the combination hoppers 4 and 5 to the outer chute 7a or 7b are transferred to the collecting hopper 9a or 9b can be made short and substantially equal. Irrespective of the characteristics of almost all objects to be weighed, the objects to be weighed which have been discharged from the combination hoppers 4 and 5 can be gathered to the associated collecting hopper 9a or 9b in a short time. Therefore, a structure of the collecting chutes can be made relatively simple, and the combination weigher is able to operate at a high speed irrespective of the characteristics of almost all the objects to be weighed. In addition, each combination weigher unit is able to carry out the double shift operation or the triple shift operation without slowing the operation speed.

Example 2 of Embodiment 1

Figure 4:
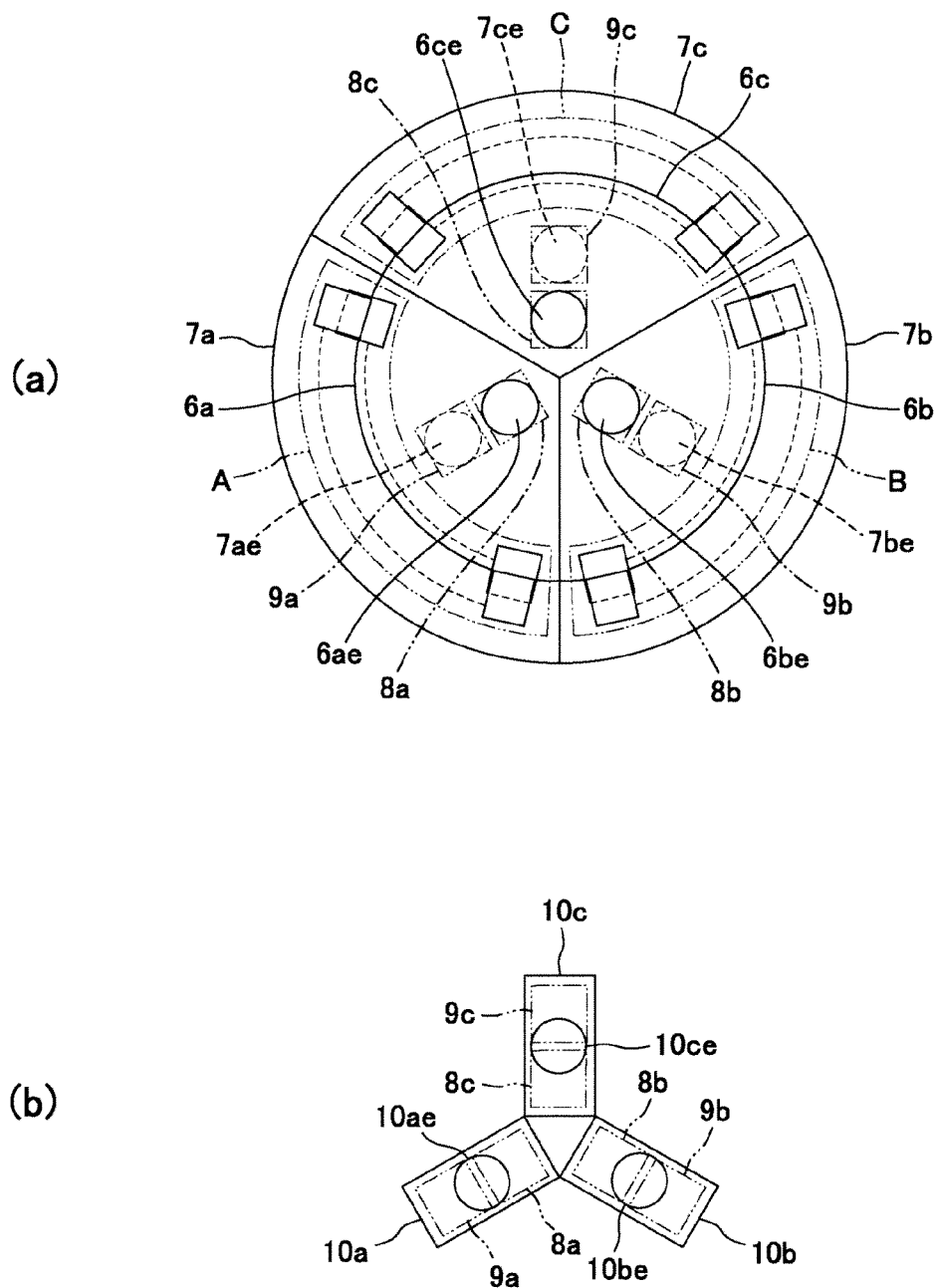
FIG. 4 (a) is a schematic view of collecting chutes, weighing hoppers and memory hoppers of a combination weigher according to an example 2 of the embodiment 1 of the present invention, as viewed from above.

FIG. 4 (*a*) is a schematic view of collecting chutes (inner chutes and outer chutes), weighing hoppers and memory hoppers of a combination weigher (weighing system) according to an example 2 of the embodiment 1 of the present invention, as viewed from above, and FIG. 4(*b*) is a schematic view of lower chutes of the combination weigher as viewed from above.

In the example 1 shown in FIG. 1, two combination weigher units are equipped, while in the present example, three combination weigher units are equipped. In the present example, as in the example 1, the center base body 11, the dispersion feeder 1, the linear feeders 2, the feeding hoppers 3, the weighing hoppers 4 attached with the weight sensors 41, and the memory hoppers 5, are equipped, and are identical in configuration to those of the example 1. Therefore, explanation therefor is omitted.

In the example 2, all the weighing hoppers 4 and memory hoppers 5 are divided into three groups A, B, and C, and combination weigher units are equipped to respectively include the three groups A, B, and C and to respectively correspond to the groups A, B, and C. So, three inner chutes 6a, 6b, and 6c are equipped to respectively correspond to the three groups A, B, and C. Collecting hoppers 8a, 8b, and 8c are respectively provided at bottom part discharge outlets 6ae, 6be, and 6ce of the inner chutes 6a, 6b, and 6c to hold and discharge the objects to be weighed. Three outer chutes 7a, 7b, and 7c are provided to respectively correspond to the three groups A, B, and C. Collecting hoppers 9a, 9b, and 9c are provided at bottom part discharge outlets 7ae, 7be, and 7ce of the outer chutes 7a, 7b, and 7c to hold and discharge the objects to be weighed. Hereinafter, a combination weigher unit including the group A is referred to as a first combination weigher unit, a combination weigher unit including the group B is referred to as a second combination weigher unit, and a combination weigher unit including the group C is referred to as a third combination weigher unit.

Below the collecting hoppers 8a and 9a of the first combination weigher unit, a lower chute 10a is provided to receive the objects to be weighed which have been discharged from the collecting hopper 8a or 9a and to discharge the objects to be weighed from a bottom part discharge outlet 10ae thereof. Likewise, below the collecting hoppers 8b and 9b of the second combination weigher unit, a lower chute 10b is provided to receive the objects to be weighed which have been discharged from the collecting hopper 8b or 9b and to discharge the objects to be weighed from a bottom part discharge outlet 10be thereof. Likewise, below the collecting hoppers 8c and 9c of the third combination weigher unit, a lower chute 10c is provided to receive the objects to be weighed which have been discharged from the collecting hopper 8c or 9c and to discharge the objects to be weighed from a bottom part discharge outlet 10ce thereof.

Below the lower chutes 10a, 10b and 10c of the combination weigher, three packaging machines (not shown) or a packaging machine (not shown) having three inlets into which the objects to be weighed are fed are disposed. The objects to be weighed which have been discharged from the discharge outlet 10ae of the lower chute 10a, the discharge outlet 10be of the lower chute 10b, and the discharge outlet 10ce of the lower chute 10c are fed into different inlets (first to third packaging machine inlets) and are charged into package bags for packaging. Thus, in the present example, the objects to be weighed which have been discharged from the collecting hopper 8a or 9a in the first combination weigher unit are fed into the first packaging machine inlet through the lower chute 10a, the objects to be weighed which have been discharged from the collecting hopper 8b or 9b in the second combination weigher unit are fed into the second packaging machine inlet through the lower chute 10b, and the objects to be weighed which have been discharged from the collecting hopper 8c or 9c in the third combination weigher unit are fed into the third packaging machine inlet through the lower chute 10c.

The control unit 20 (see FIG. 1(*a*)) is equipped, which controls an operation of the entire combination weigher of the present example and performs a combination process to determine a combination (discharge combination) made up of the weighing hoppers 4 and the memory hoppers 5 which will discharge the objects to be weighed for each of the first, second, and third combination weigher units. The combination process for each combination weigher unit is identical to that of the example 1.

The other configuration is identical to that of the example 1 and will not be further described.

In the example 2, each combination weigher unit may be configured to carry out the double shift operation and the triple shift operation as in the example 1.

The timing charts of the first and second combination weigher units are similar to those of FIG. 2, for example, and the timing chart of the third combination weigher unit is similar to those of the first and second combination weigher units, in the configuration to cause the first, second and third combination weigher units to carry out the double shift operation.

The timing charts of the first and second combination weigher units are similar to those of FIG. 3, for example, and the timing chart of the third combination weigher unit is similar to those of the first and second combination weigher units, in the configuration to cause the first, second and third combination weigher units to carry out the triple shift operation.

The combination weigher of the example 2 differs from the combination weigher of the example 1 in the number of combination weigher units equipped, and is able to achieve advantages similar to those of the combination weigher of the example 1.

Whereas the control unit 20 executes control to cause the first, second and third combination weigher units to operate at same timings as described above in the above operation, as in the case of the example 1, it may alternatively execute control to cause the first, second and third combination weigher units to operate at different timings. In this case, for example, the control unit 20 may be configured to receive a feed command signal corresponding to the first combination weigher unit as an input, a feed command signal corresponding to the second combination weigher unit as an input, and a feed command signal corresponding to the third combination weigher unit as an input, from the packaging machine, and to control the operation of each combination weigher unit based on the associated feed command signal.

As in the configuration of the example 1 in which the two combination weigher units are equipped and as in the configuration of the example 2 in which the three combination weigher units are equipped, four or more combination weigher units may be equipped.

It should be noted that, whereas in the embodiment 1, each combination weigher unit is configured to carry out the double shift operation and the triple shift operation, it may be configured to carry out the single shift operation with a low operation speed (discharge speed), as a matter of course. When each combination weigher unit is configured to carry out the single shift operation, combination calculation is performed once within the one operation cycle time Tw, the combination hoppers 4 and 5 perform the discharge operation once within the one operation cycle time Tw, and the collecting hoppers perform the discharge operation with respect to the packaging machine once within the one operation cycle time Tw. In this case, one discharge cycle time of the combination weigher is equal to the one operation cycle time Tw.

Embodiment 2

Example a of Embodiment 2

Figure 5:
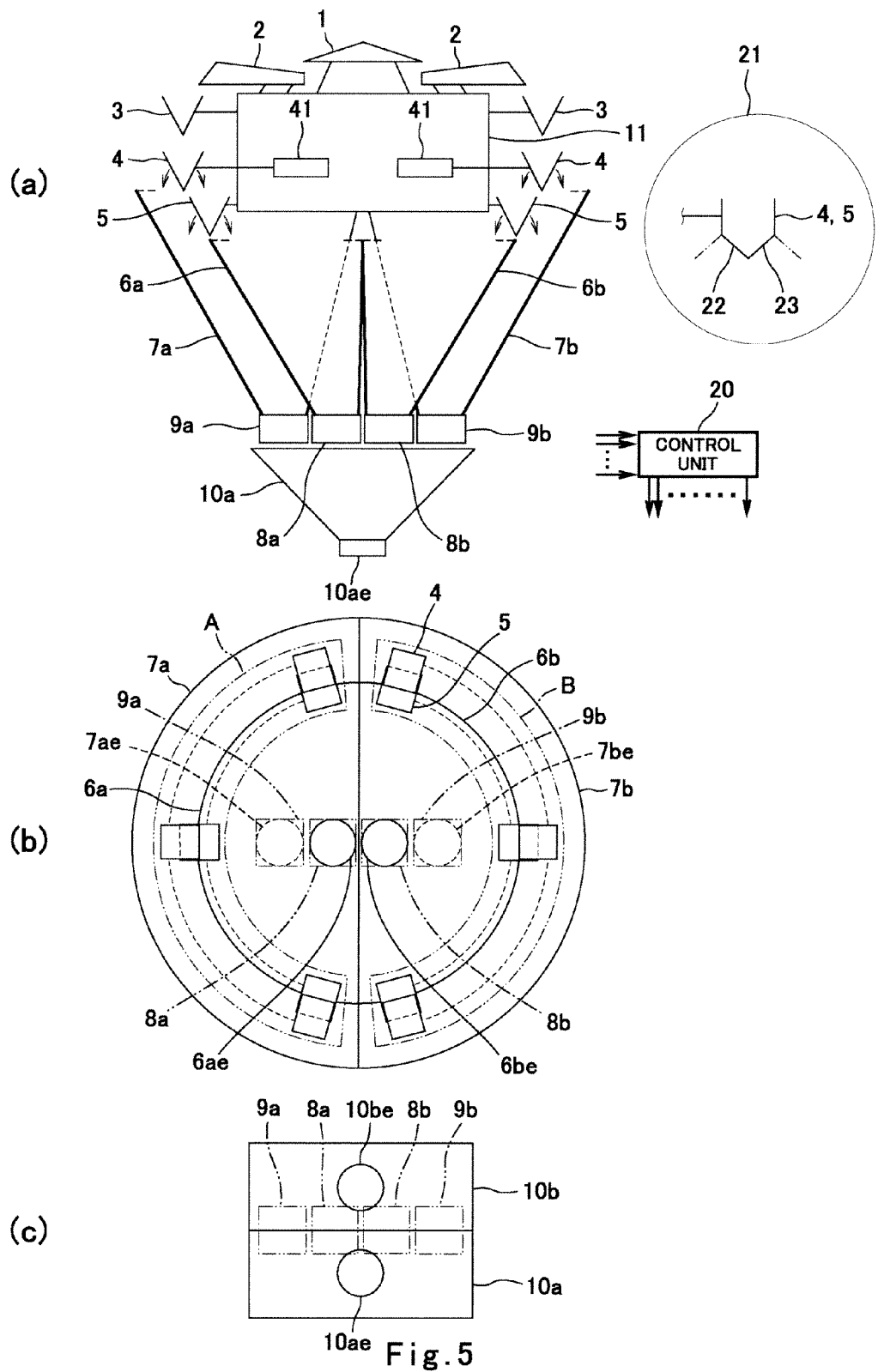
FIG. 5 (a) is a schematic partial cross-sectional view of a combination weigher according to an example a of an embodiment 2 of the present invention, as viewed from laterally.

FIG. 5 (*a*) is a schematic partial cross-sectional view of a combination weigher (weighing system) according to an example a of an embodiment 2 of the present invention, as viewed from laterally, FIG. 5(*b*) is a schematic view of collecting chutes (inner chutes and outer chutes), weighing hoppers, and memory hoppers of the combination weigher as viewed from above, and FIG. 5(*c*) is a schematic view of lower chutes of the combination weigher as viewed from above.

As shown in FIG. 5(*c*), the combination weigher according to the example a of the present embodiment is configured in such a manner that two lower chutes 10*a* and 10*b* are disposed below four collecting hoppers 8*a*, 8*b*, 9*a* and 9*b*, the collecting hoppers 8*a* and 9*b* are provided with gates (not shown) to be able to discharge the objects to be weighed to the lower chute 10*a*, and the collecting hoppers 8*b* and 9*a* are provided with gates (not shown) to be able to discharge the objects to be weighed to the lower chute 10*b*. The objects to be weighed which have been discharged to the lower chute 10*a* or 10*b* are discharged from the associated discharge outlet 10*ae* or 10*be*, respectively. The other configuration is identical to that of the example 1 of the embodiment 1 shown in FIG. 1, and will not be further described. Nonetheless, in the example a of the present embodiment, the combination process performed by the control unit 20 and operation timings are different from those of the example 1 of the embodiment 1. In the example a, as in the example 1, the first combination weigher unit includes the weighing hoppers 4 and the memory hoppers 5 in the group A, and the associated components corresponding to the group A, and the second combination weigher unit includes the weighing hoppers 4 and the memory hoppers 5 in the group B and the associated components corresponding to the group B.

Below the lower chutes 10*a* and 10*b* of the combination weigher, two packaging machines (not shown) or a twin-inlet packaging machine (not shown) having two inlets into which the objects to be weighed are fed are disposed. The objects to be weighed which have been discharged from the discharge outlet 10*ae* of the lower chute 10*a* and the discharge outlet 10*be* of the lower chute 10*b* are respectively fed into the different packaging machine inlets (first and second packaging machine inlets) and are charged into package bags for packaging. Thus, in the present example, the objects to be weighed which have been discharged from the collecting hopper 8*a* in the first combination weigher unit and from the collecting hopper 9*b* in the second combination weigher unit are fed into the first packaging machine inlet through the lower chute 10*a*, while the objects to be weighed which have been discharged from the collecting hopper 9*a* in the first combination weigher unit and from the collecting hopper 8*b* in the second combination weigher unit are fed into the second packaging machine inlet through the lower chute 10*b*.

The control unit 20 includes a control means and a combination calculation means for each combination weigher unit to control the operation of the entire combination weigher and to perform a combination process to determine a combination (discharge combination) made up of the weighing hoppers 4 and the memory hoppers 5 which will discharge the objects to be weighed, for each of the first and second combination weigher units. In the combination process, the combination calculation is performed based on measured values (measured values obtained using the weight sensors 41) of the weights of the objects to be weighed inside the weighing hoppers 4 and the memory hoppers 5 to select two combinations made up of the weighing hoppers 4 and the memory hoppers 5 in which a combination measured value (=combination weight value) which is a total of the measured values is within an allowable range (predetermined weight range) with respect to a target weight value and to determine them as discharge combinations. The measured values of the objects to be weighed inside the memory hoppers 5 for use in this combination process are measured values obtained using the weight sensors 41 in the weighing hoppers 4 located thereabove. The combination process will be described in detail.

Hereinafter, the weighing hoppers 4 and the memory hoppers 5 are collectively referred to as combination hoppers 4 and 5 when they are not particularly distinguished from each other.

An outline of the operation of the above configured combination weigher will be first described.

The objects to be weighed are supplied from the external supplying device to the dispersion feeder 1. The dispersion feeder 1 feeds the objects to be weighed to the feeding hopper 3 through the linear feeder 2. The feeding hopper 3 feeds the objects to be weighed to the weighing hopper 4. The weight sensor 41 measures the weight of the objects to be weighed which have been fed into the weighing hopper 4, and sends the measured value to the control unit 20. The objects to be weighed whose weight has been measured in the weighing hopper 4 are supplied to the memory hopper 5 located therebelow if the memory hopper 5 is empty. The control unit 20 performs the combination process to determine two discharge combinations simultaneously for each combination weigher unit. Then, the combination hoppers 4 and 5 selected to make up of the two discharge combinations in each combination weigher unit discharge the objects to be weighed. If the objects to be weighed are held in the weighing hopper 4 located above the memory hopper 5 which is empty, the weighing hopper 4 feeds the objects to be weighed to the empty memory hopper 5. The feeding hopper 3 feeds the objects to be weighed to the empty weighing hopper 4. The linear feeder 2 feeds the objects to be weighed to the empty feeding hopper 3.

In the above configuration, in each combination weigher unit, discharge directions in which the combination hoppers 4 and 5 making up of the two discharge combinations determined simultaneously in the combination process are made different. To be specific, in each combination weigher unit, the combination hoppers 4 and 5 making up of one of the two discharge combinations are caused to discharge the objects to be weighed to the inner chute (6a or 6b) and simultaneously, the combination hoppers 4 and 5 making up of the other discharge combination discharge the objects to be weighed to the outer chute (7a or 7b). In addition, the inner chute collecting hopper (8a or 8b) and the outer chute collecting hopper (9a or 9b) are caused to discharge the objects to be weighed simultaneously. For example, in the two discharge combinations of the first combination weigher unit, the weighing hopper 4 is selected to make up of the discharge combination for discharging the objects to be weighed to the inner chute 6a, only when the corresponding memory hopper 5 disposed therebelow is selected together. In this case, the weighing hopper 4 and the memory hopper 5 open their inner gates to discharge the objects to be weighed in such a manner that the objects to be weighed are discharged from the weighing hopper 4 onto the inner chute 6a through inside of the memory hopper 5. To make up of the discharge combination for discharging the objects to be weighed to the inner chute 6a, the memory hopper 5 may be selected freely. To make up of the discharge combination for discharging the objects to be weighed to the outer chute 6a, the weighing hopper 4 and the memory hopper 5 may be selected freely. The same applies to the second combination weigher unit.

Figure 6:
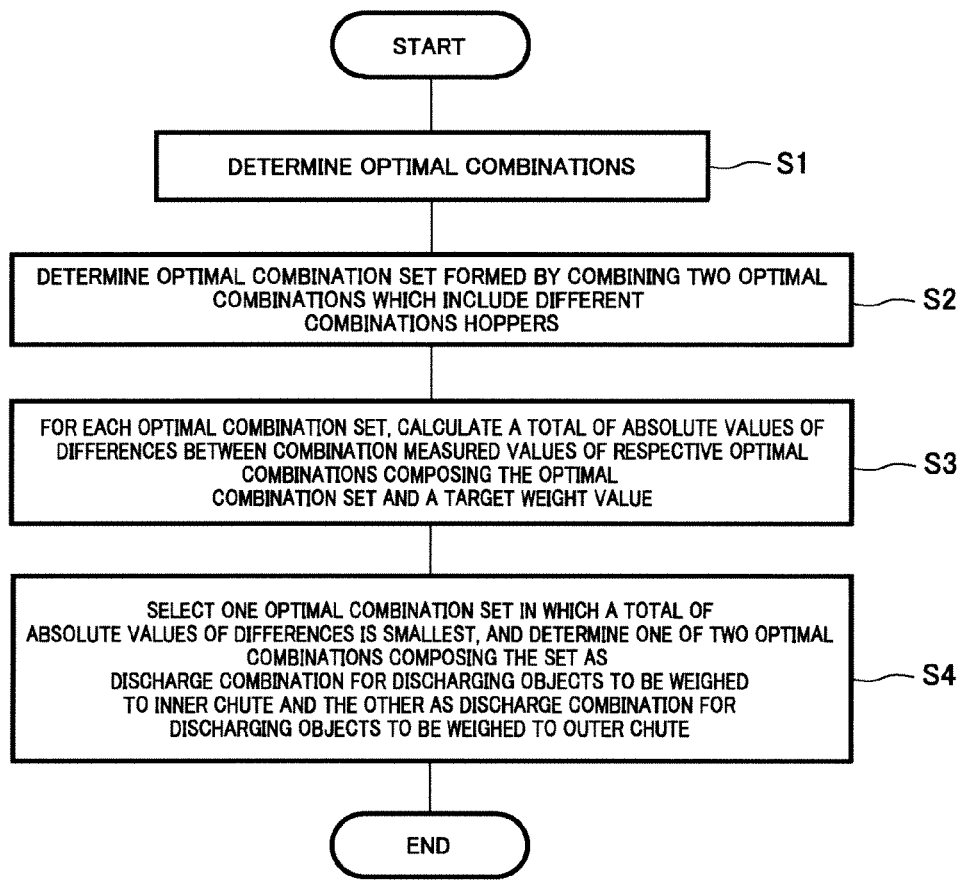
FIG. 6 is a flowchart showing a procedure of a first combination process in the combination weigher according to the embodiment 2 of the present invention.

Subsequently, the combination process of the present embodiment will be described in detail. FIG. 6 is a flowchart showing the combination process of an arbitrary combination weigher unit of the present embodiment. For the first and second combination weigher units, the combination process shown in steps S1 to S4 is performed.

In step S1, combination calculation is performed using measured values of the objects to be weighed which have been fed to all the combination hoppers 4 and 5 in the arbitrary combination weigher unit to select combinations in which a combination measured value which is a total of measured values is within an allowable range with respect to a target weight value and to determine them as optimal combinations.

In step S2, an optimal combination set (pair of optimal combinations) formed by combining two optimal combinations which include different combination hoppers 4 and 5 is determined. In the present embodiment, if weighing hoppers 4 are selected to make up of both of the two optimal combinations to be combined and the memory hoppers 5 corresponding to the selected weighing hoppers 4 are not selected, the two optimal combinations are excluded from the optimal combination set (are not selected for the optimal combination set). Therefore, in cases where weighing hoppers 4 are included in the two optimal combinations composing the optimal combination set, the memory hopper 5 corresponding to the selected weighing hopper 4 is always selected to make up of at least one optimal combination.

In step S3, for each optimal combination set, absolute values of differences between combination measured values of respective optimal combinations composing the optimal combination set and a target weight value are calculated and a total of the absolute values of the differences is calculated. The absolute values of the differences between the combination measured values and the target weight value mean absolute values obtained by subtracting the target weight value from the combination measured values or by subtracting the combination measured values from the target value, and are zero or positive values.

In step S4, one optimal combination set in which the total of the absolute values of the differences calculated in step S3 is smallest is selected, and one of the two optimal combinations composing the set is determined as the discharge combination (first discharge combination) for discharging the objects to be weighed to the inner chute (6a or 6b), and the other of the two optimal combinations is determined as the discharge combination (second discharge combination) for discharging the objects to be weighed to the outer chute (7a or 7b). If a weighing hopper 4 is selected to make up of one of the two optimal combinations composing the selected optimal combination set, and a memory hopper 5 corresponding to the selected weighing hopper 4 is not selected, the optimal combination is determined as the second discharge combination for discharging the objects to be weighed to the outer chute, and the other optimal combination is determined as the first discharge combination for discharging the objects to be weighed to the inner chute. If an optimal combination which includes a weighing hopper 4 but does not include a memory hopper 5 corresponding to the selected weighing hopper 4 is not included in a selected optimal combination set, any predetermined method may be employed to determine which of the two optimal combinations as the first discharge combination or the second discharge combination. For example, serial numbers may be assigned to the memory hoppers 5, an optimal combination including a memory hopper 5 with a smallest number may be determined as the first discharge combination, and the other optimal combination may be determined as the second discharge combination, or vice versa. Alternatively, the first and second optimal combinations may be determined according to the magnitude of the combination measured value. For example, an optimal combination with a larger combination measured value may be determined as the first combination and an optimal combination with a smaller combination measured value may be determined as the second combination, or vice versa. In a further alternative, the optimal combination with the larger combination measured value and the optimal combination with the smaller combination measured value may be alternately determined as the first and second discharge combinations, every time combination process is performed.

Whereas in steps S3 and S4, for each optimal combination set, the total of the absolute values of the differences between the combination measured values of the respective optimal combinations and the target weight value is calculated, and the optimal combination set in which the total of the absolute values of the differences is smallest is selected to determine the two discharge combinations, the total of squares of the absolute values of the differences between the combination measured values of the respective optimal combinations and the target weight value, may be calculated, and an optimal combination set in which a total of the squares of the differences is smallest may be selected to determine it as two discharge combinations, for each optimal combination set.

As described above, two discharge combinations are determined in one combination process. In the example a, as in the configuration to cause the combination weigher to carry out the double shift operation in the example 1 of the embodiment 1, by setting the number of weighing hoppers 4 and the number of memory hoppers 5 respectively to nine or ten in each of the groups A and B, and by setting the number of the combination hoppers 4 and 5 which would be selected in the combination process to make up of one optimal combination set in the combination process to four, high combination weighing precision is obtained.

Figure 7:
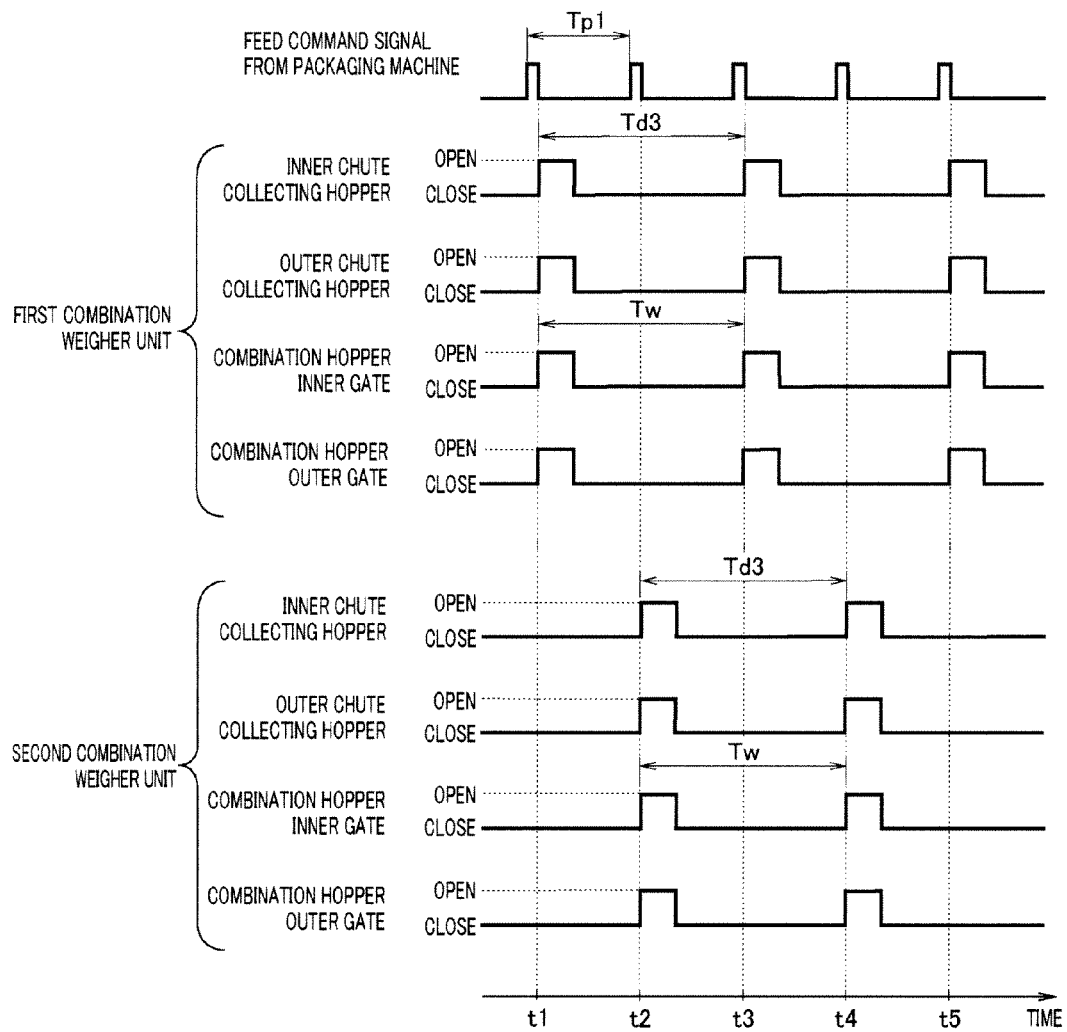
FIG. 7 is a timing chart showing an operation of a combination weigher according to the example a of the embodiment 2 of the present invention.

FIG. 7 is a timing chart showing the operation of the combination weigher according to the example a of the present embodiment.

One operation cycle time Tw in each combination weigher unit is, for example, a time period taken to accomplish a procedure in which immediately after two discharge combinations have been determined in a combination process in a previous operation cycle, weighing hoppers 4 selected to make up of these two discharge combinations (when the weighing hoppers 4 are selected to make up of the discharge combinations) discharge the objects to be weighed, the objects to be weighed are subsequently fed to the weighing hoppers 4 making up of these discharge combinations, time for stabilizing the weight sensors 41 lapses, the weight sensors 41 measure the weights of the objects to be weighed inside these weighing hoppers 4, and thereafter next combination process is performed to determine two discharge combinations. One weighing cycle time is, for example, a time period taken to accomplish a procedure in which weighing hoppers 4 selected to make up of two discharge combinations determined in a combination process in a previous operation cycle (when the weighing hoppers 4 are selected to make up of the discharge combinations), start to discharge the objects to be weighed, the objects to be weighed are subsequently fed to the weighing hoppers 4 making up of the two discharge combinations, time for stabilizing the weight sensors 41 lapses, the weight sensors 41 measures the weights of the objects to be weighed inside these weighing hoppers 4, and thereafter next combination process is performed to determine two discharge combinations. Therefore, one weighing cycle time is equal to one operation cycle time Tw in a case where an allowance time, a wait time, etc, which lapses from when two discharge combinations are determined in a combination process until hoppers selected to make up of the two discharge combinations start to discharge the objects to be weighed, is zero. It is desired that the operation cycle time Tw be equal to one weighing cycle time to carry out high-speed operation. Therefore, in present embodiment, the one operation cycle time Tw is equal to or substantially equal to one weighing cycle time.

In the example a, the operation of the first combination weigher unit and the operation of the second combination weigher unit take place at timings with Tw/2 time difference, but are similar. For each combination weight unit, a combination process is performed to determine two discharge combinations once in every Tw time and the combination hoppers 4 and 5 making up of the two discharge combinations determined in the combination process discharge the objects to be weighed simultaneously. In addition, the inner chute collecting hopper (8a or 8b) and the outer chute collecting hopper (9a or 9b) discharge the objects to be weighed simultaneously once in every Tw time. Thereby, in each combination weigher unit, the objects to be weighed making up of two discharge combinations are fed to the packaging machine within one operation cycle time Tw. In this case, one discharge cycle time Td3 in each combination weigher unit is equal to one operation cycle time Tw and is twice as long as one packaging cycle time Tp1 of the packaging machine.

Receiving, for example, a feed command signal from the packaging machine, as an input, the control unit 20 causes the inner chute collecting hopper 8a and the outer chute collecting hopper 9a in the first combination weigher unit, for example, to open their gates simultaneously to discharge the objects to be weighed to the packaging machine, in response to the feed command signal (time t1). And, the control unit 20 causes the combination hoppers 4 and 5 selected to make up of one of the discharge combinations to open their inner gates based on the operation timings of the gates of the collecting hoppers 8a and 9a to discharge the objects to be weighed to the inner chute 6a and causes the combination hoppers 4 and 5 selected to make up of the other discharge combination to open their outer gates based on the operation timings of the gates of the collecting hoppers 8a and 9a to discharge the objects to be weighed to the outer chute 7a (time t1). Receiving a subsequent feed command signal as an input, the control unit 20 causes the inner chute collecting hopper 8b and the outer chute collecting hopper 9b in the second combination weigher unit to open their gates simultaneously to discharge the objects to be weighed to the packaging machine (time t2). And, the control unit 20 causes the combination hoppers 4 and 5 selected to make up of one of the discharge combinations to open their inner gates based on the operation timings of the gates of the collecting chutes 8b and 9b to discharge the objects to be weighed to the inner chute 6b and causes the combination hoppers 4 and 5 selected to make up of the other discharge combination to open their outer gates based on the operation timings of the gates of the collecting hoppers 8b and 9b to discharge the objects to be weighed to the outer chute 7b (time t2). The above operation is repeated every time the feed command signal is received as the input (time t3, time t4, time t5).

In the operation shown in FIG. 7, the objects to be weighed which have been discharged from the combination hoppers 4 and 5 by opening the inner gates in the first combination weigher unit at time t1 are gathered to and held in the inner chute collecting hopper 8a before time t3, and the collecting hopper 8a opens its gate to feed the objects to be weighed in the collecting hopper 8a to the first packaging machine inlet through the lower chute 10a at time t3. Likewise, the objects to be weighed which have been discharged from the combination hoppers 4 and 5 by opening the outer gates in the first combination weigher unit at time t1 are gathered to and held in the outer chute collecting hoppers 9a before time t3, and the collecting hopper 9a opens its gate to feed the objects to be weighed in the collecting hopper 9a to the second packaging machine inlet through the lower chute 10b at time t3.

The objects to be weighed which have been discharged from the combination hoppers 4 and 5 by opening the inner gates in the second combination weigher unit at time t2 are gathered to and held in the inner chute collecting hopper 8b before time t4, and the collecting hopper 8b opens its gate to feed the objects to be weighed in the collecting hopper 8b to the second packaging machine inlet through the lower chute 10b at time t4. Likewise, the objects to be weighed which have been discharged from the combination hoppers 4 and 5 by opening the outer gates in the second combination weigher unit at time t2 are gathered to and held in the outer chute collecting hopper 9b before time t4, and the collecting hopper 9b opens its gate to feed the objects to be weighed in the collecting hopper 9b to the first packaging machine inlet through the lower chute 10a at time t4.

Whereas in the operation of FIG. 7, the opening and closing timings of the gates of the inner chute collecting hopper and the outer chute collecting hopper are the same as the opening and closing timings of the inner gate and the outer gate of the combination hoppers in each combination weigher unit, these are merely exemplary. For example, the control unit 20 may control the opening and closing timings of the inner gate and the outer gate of the combination hoppers based on the opening and closing timings of the gates of the collecting hoppers to make the opening and closing timings of the gates different between the collecting hoppers and the combination hoppers.

By causing the two combination weigher units to operate in the manner as described above, the objects to be weighed are fed to each of the two packaging machine inlets once in every Tw/2 time. Therefore, the objects to be weighed are discharged twice to each of the two packaging machine inlets within the one operation cycle time Tw. As a result, productivity (total number of times the combination weigher discharge the objects to be weighed to the packaging machine) within a specified time period can be improved.

In the example a of the present embodiment, each combination weigher unit is configured in such a manner that the inner chute 6a or 6b is disposed to respectively correspond to the group A or B of the combination hoppers 4 and 5 arranged in a circular-arc shape (semi-circular shape in the example a) having a central angle of approximately 180 degrees or smaller, and the outer chute 7a or 7b is disposed along outside of the inner chute 6a or 6b, as in the example 1 of the embodiment 1. So, the collecting chutes (inner chute and outer chute) can be made to have a relatively simple structure, and the distance over which the objects to be weighed which have been discharged from the combination hoppers 4 and 5 to the inner chute 6a or 6b are transferred and the distance over which the objects to be weighed which have been discharged from the combination hoppers 4 and 5 to the outer chute 7a or 7b are transferred to the collecting hopper 9a or 9b can be made short and substantially equal. Irrespective of the characteristics of almost all objects to be weighed, all of the objects to be weighed which have been discharged from the combination hoppers 4 and 5 can be gathered to the associated collecting hoppers 9a or 9b in a short time. Therefore, a structure of the collecting chutes can be made to have a relatively simple structure, and the combination weigher is able to operate at a high speed irrespective of the characteristics of almost all objects to be weighed. In addition, each combination weigher unit is able to select two combinations of the objects to be weighed and perform discharge operation of the two combinations within the one operation cycle time Tw without slowing the operation speed.

Furthermore, since in the combination process (first combination process) shown in the flowchart of FIG. 6, an optimal combination set in which the total of the absolute values of the differences between the combination measured values of the respective optimal combinations and the target weight value is smallest is selected and the two optimal combinations composing the optimal combination set are determined as the discharge combinations, combination weighing precision for the discharged objects to be weighed can be improved as a whole.

The first combination process shown in the flowchart of FIG. 6 may be replaced by a second combination process or a third combination process to be described below.

Figure 8:
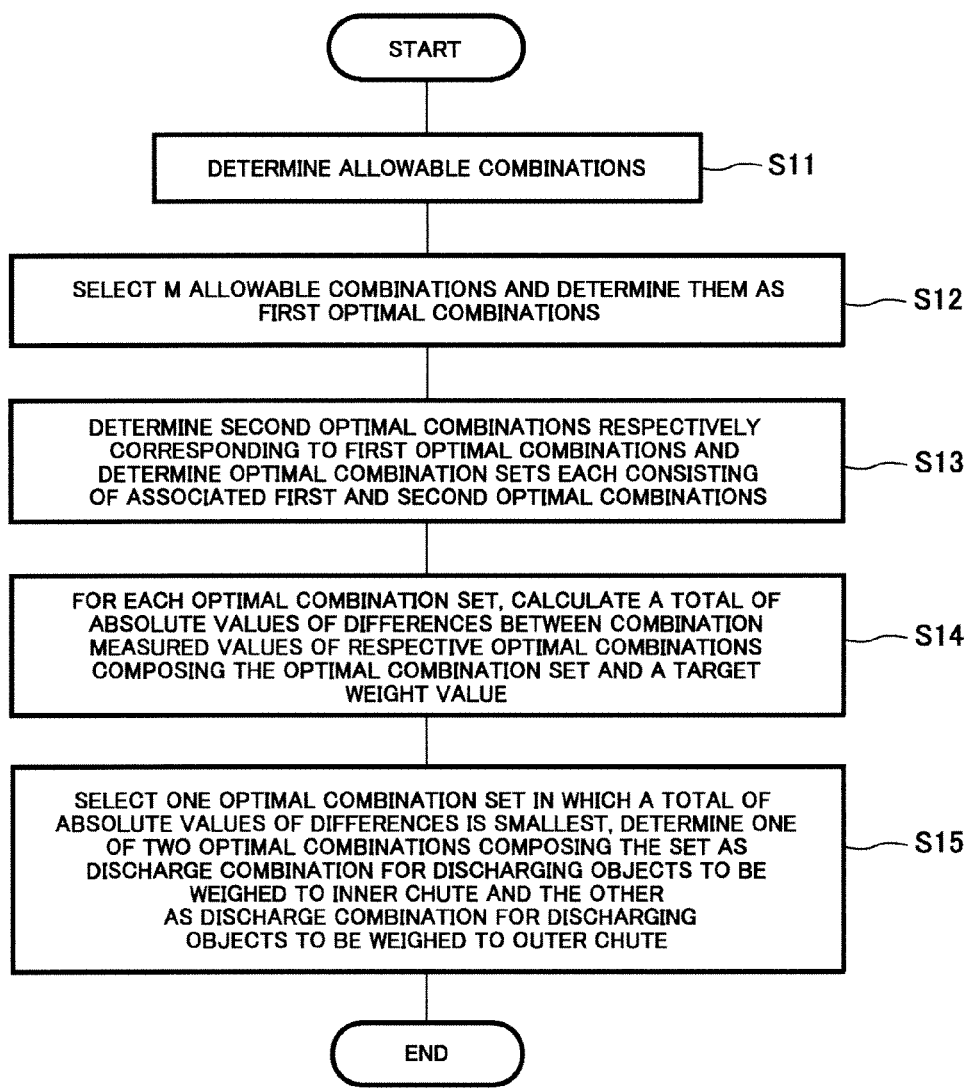
FIG. 8 is a flowchart showing a procedure of a second combination process in the combination weigher according to the embodiment 2 of the present invention.

First, the second combination process will be described. FIG. 8 is a flowchart showing the combination process for an arbitrary combination weigher unit in the present embodiment. In the first and second combination weigher units, the combination process shown in steps S11 to S15 is performed.

In step S11, combination calculation is performed using measured values of the objects to be weighed which have been fed to all the combination hoppers 4 and 5 in an arbitrary combination weigher unit to select combinations in which a combination measured value which is a total of the measured values is within an allowable range with respect to a target weight value and to determine them as allowable combinations. The process in step S11 is the same as the process of step S1 of FIG. 6, and the optimal combinations determined in step S1 correspond to the allowable combinations determined in step S11.

In step S12, predetermined m (m: plural number), for example ten allowable combinations are selected from all the allowable combinations by giving priority to those in which absolute values of difference between combination measured values and the target weight value are smaller, and the selected allowable combinations are determined as first optimal combinations.

In step S13, one allowable combination is selected from allowable combinations made up of the combination hoppers 4 and 5 obtained by excluding the combination hoppers 4 and 5 making up of an arbitrary first optimal combination from all the combination hoppers 4 and 5 in the combination weigher unit, by giving priority to a combination in which an absolute value of a difference between a combination measured value and the target weight value is smaller, and the selected allowable combination is determined as a second optimal combination corresponding to the arbitrary first optimal combination. In the same manner, second optimal combinations respectively corresponding to m first optimal combinations are determined. In this manner, the second optimal combinations respectively corresponding to m first optimal combinations are determined, and m optimal combination sets each consisting of the associated first optimal combination and second optimal combination are determined. It should be noted that in the present embodiment, when weighing hoppers 4 are selected to make up of two combinations consisting of a first optimal combination and an allowable combination which is a candidate of the associated second optimal combination but memory hoppers 5 corresponding to the selected weighing hoppers 4 are not selected, the allowable combination is not selected as the second optimal combination. Therefore, when the weighing hoppers 4 are selected to make up of two optimal combinations composing an optimal combination set, the memory hopper 5 corresponding to the selected weighing hopper 4 is always selected to make up of at least one optimal combination.

In step S14, for each optimal combination set, absolute values of differences between combination measured values of the first and second optimal combinations composing the optimal combination set and the target weight value are calculated and a total of the absolute values of the differences is calculated.

In step S15, one optimal combination set in which the total of the absolute values of the differences calculated in step S14 is smallest is selected, one of the two optimal combinations composing the optimal combination set is determined as a discharge combination (first discharge combination) for discharging the objects to be weighed to the inner chute (6a or 6b) and the other optimal combination is determined as the discharge combination (second discharge combination) for discharging the objects to be weighed to the outer chute (7a or 7b). If a weighing hopper 4 is selected to make up of one of the two optimal combinations composing the selected optimal combination set but a memory hopper 5 corresponding to the selected weighing hopper 4 is not selected, the optimal combination is determined as the second discharge combination for discharging the objects to be weighed to the outer chute and the other optimal combination is determined as the first discharge combination for discharging the objects to be weighed to the inner chute. If an optimal combination which includes a weighing hopper 4 but does not include a memory hopper 5 corresponding to the selected weighing hopper 4 is not included in a selected optimal combination set, any specified method may be employed to determine which of the two optimal combinations is the first discharge combination or the second discharge combination. For example, serial numbers may be assigned to the memory hoppers 5, an optimal combination including the memory hopper 5 with a smallest number may be determined as the first discharge combination, and the other optimal combination may be determined as the second discharge combination, or vice versa. Alternatively, the first and second optimal combinations may be determined according to the magnitude of the combination measured values. For example, an optimal combination with a larger combination measured value may be determined as the first discharge combination and an optimal combination with a smaller combination measured value may be determined as the second discharge combination, or vice versa. In a further alternative, the optimal combination with the larger combination measured value and the optimal combination with the smaller combination measured value may be alternately determined as the first and second discharge combinations, every time the combination process is performed.

Whereas in steps S14 and S15, for each optimal combination set, the total of the absolute values of the differences between the combination measured values of the respective optimal combinations and the target weight value is calculated, and one optimal combination set in which the total of the absolute values of the differences is smallest is selected to determine it as the two discharge combinations, a total of squares of differences between the combination measured values of the respective optimal combinations and the target weight value, may be calculated, and one optimal combination set in which the total of the squares of the differences is smallest is selected to determine it as two discharge combinations, for each optimal combination set.

Subsequently, the third combination process will be described. The third combination process is performed for the first and second combination weigher units as described below.

In the third combination process, combination calculation is performed using measured values of the objects to be weighed which have been fed to all the combination hoppers 4 and 5 in an arbitrary combination weigher unit to select combinations in which a combination measured value which is a total of measured values is within an allowable range with respect to a target weight value and to determine them as allowable combinations. One allowable combination in which an absolute value of a difference between a combination measured value and the target weight value is smallest is selected from all the allowable combinations and is determined as the first optimal combination.

Then, one allowable combination is selected from allowable combinations consisting of combinations made up of the combination hoppers 4 and 5 remaining after excluding the combination hoppers 4 and 5 making up of the first optimal combination from all the combination hoppers 4 and 5 in the combination weigher unit, by giving priority to a combination in which an absolute value of a difference between a combination measured value and a target weight value is smaller, and the selected allowable combination is determined as a second optimal combination. It should be noted that in present embodiment, when weighing hoppers 4 are selected to make up of two combinations consisting of a first optimal combination and an allowable combination which is a candidate of the associated second optimal combination but a memory hopper 5 corresponding to the selected weighing hopper 4 is not selected, the allowable combination is not selected as the second optimal combination. Therefore, when the weighing hoppers 4 are selected to make up of both of first and second optimal combinations, the memory hopper 5 corresponding to the selected weighing hopper 4 is always selected to make up of at least one optimal combination.

Then, one of the first and second optimal combinations is determined as the discharge combination (first discharge combination) for discharging the objects to be weighed to the inner chute and the other is determined as the discharge combination (second discharge combination) for discharging the objects to be weighed to the outer chute. If a weighing hopper 4 is selected to make up of one of the two optimal combinations but a memory hopper 5 corresponding to the selected weighing hopper 4 is not selected, the optimal combination is determined as the second discharge combination for discharging the objects to be weighed to the outer chute and the other optimal combination is determined as the first discharge combination for discharging the objects to be weighed to the inner chute. If the first optimal combination and the second optimal combination are not a combination which includes a weighing hopper 4 but does not include a memory hopper 5 corresponding to the selected weighing hopper 4, any specified method may be employed to determine which of the two optimal combinations is the first discharge combination or second discharge combination, as in the case of the second combination process.

In cases where the allowable range with respect to the target weight value is set to not less than the target weight value, i.e., a lower limit value of the allowable range is equal to the target weight value in the first, second, and third combination processes, an absolute value of a difference between a combination measured value of an optimal combination or an allowable combination and the target weight value is equal to a value (difference) obtained by subtracting the target weight value from the combination measured value. In this case, therefore, the operation in which the total of the absolute values of the differences between the combination measured values of the respective optimal combinations and the target weight value is calculated in step S3 in FIG. 6 and in step S14 in FIG. 8, is equivalent to the operation in which the total of the differences is calculated by subtracting the target weight value from the combination measured values of the respective optimal combinations.

In cases where a lower limit value of the allowable range is equal to the target weight value, the steps S3 and S4 in FIG. 6 and the steps S14 and 15 in FIG. 8 may be replaced by steps in which a total of combination measured values of two optimal combinations composing each optimal combination set is calculated, one optimal combination set in which the calculated total is smallest may be selected, and two optimal combinations composing the optimal combination set may be determined as first and second discharge combinations. In this case, also, two discharge combinations which are the same as those resulting from the steps S3 and S4 and the steps S14 and S15 are determined.

Since the above described first, second or third combination process is performed for each combination weigher unit to determine the two discharge combinations which will discharge the objects to be weighed once in every one operation cycle time Tw, weights of the objects to be weighed inside of all the combination hoppers 4 and 5 within each combination weigher unit can be used in the combination calculation for determining the two discharge combinations. As a result, combination weighing precision for the objects to be weighed which are discharged can be improved as a whole.

In the second combination process, a plurality of first optimal combinations are determined under an extended selection condition for the first optimal combination, the second optimal combinations respectively corresponding to the first optimal combinations are determined, and the two optimal combinations in which the total of combination measured values is smallest are selected from among them, in the third combination process. This means that the use of the second combination process can improve as a whole combination weighing precision for the objects to be weighed which are discharged rather than the use of the third combination process. Furthermore, since the optimal combination set in which the total of the absolute values of the differences between the combination measured values of the two optimal combinations and the target weight value is smallest is selected from the optimal combination sets each of which is formed by combining two optimal combinations selected from all the optimal combinations, combination weighing precision for the objects to be weighed which are discharged can be further improved as a whole.

In addition, the calculation amount decreases in the order of the first combination process, the second combination process, and the third combination process, and time taken for the combination processes can be decreased in this order.

Whereas in the example a, the collecting hopper 8a and the collecting hopper 9b are configured to discharge the objects to be weighed to the lower chute 10a and the collecting hopper 9a and the collecting hopper 8b are configured to discharge the objects to be weighed to the lower chute 10b, one of the collecting hopper 8a and the collecting hopper 9a in the first combination weigher unit may be configured to discharge the objects to be weighed to the lower chute 10a, the other collecting hopper 8a or 9a may be configured to discharge the objects to be weighed to the lower chute 10b, one of the collecting hopper 8b and the collecting hopper 9b in the second combination weigher unit may be configured to discharge the objects to be weighed to the lower chute 10a and the other collecting hopper 8b or 9b may be configured to discharge the objects to be weighed to the lower chute 10b.

Example b of Embodiment 2

Figure 9:
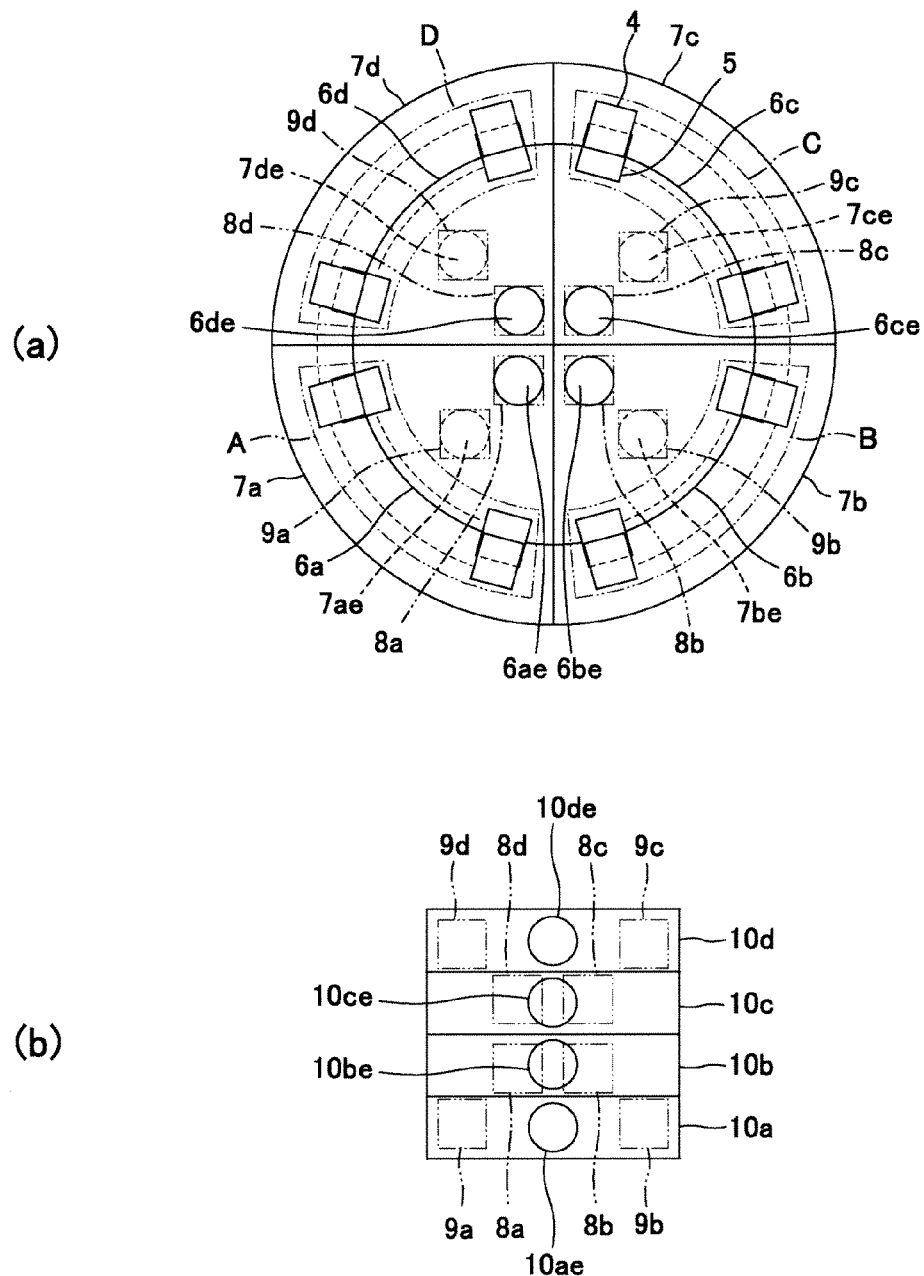
FIG. 9 (a) is a schematic view of collecting chutes, weighing hoppers and memory hoppers of a combination weigher according to an example b of the embodiment 2 of the present invention, as viewed from above.

FIG. 9 (a) is a schematic view of collecting chutes (inner chutes and outer chutes), weighing hoppers and memory hoppers of a combination weigher (weighing system) according to an example b of the embodiment 2 of the present invention, as viewed from above, and FIG. 9(b) is a schematic view of a lower chute of the combination weigher as viewed from above.

Whereas in the example a shown in FIG. 5, two combination weigher units are equipped, four combination weigher units are equipped in the present example. In the present example, as in the example a, the center body 11, the dispersion feeder 1, the linear feeders 2, the feeding hoppers 3, the weighing hoppers 4 attached with the weight sensors 41, and the memory hoppers 5, are equipped as shown in FIG. 5(a), and are identical in configuration to those of the example a. Therefore, explanation therefor is omitted.

In the example b, all the weighing hoppers 4 and memory hoppers 5 are divided into four groups A, B, C, and D and combination weigher units are equipped to respectively include the four groups A, B, C, and D and to respectively correspond to the groups A, B, C, and D. So, four inner chutes 6a, 6b, 6c, and 6d are provided to respectively correspond to the four groups A, B, C and D. Collecting hoppers 8a, 8b, 8c, and 8d are respectively provided at bottom part discharge outlets 6ae, 6be, 6ce and 6de of the inner chutes 6a, 6b, 6c, and 6d to hold and discharge the objects to be weighed. Four outer chutes 7a, 7b, 7c and 7d are provided to respectively correspond to the four groups A, B, C, and D. Collecting hoppers 9a, 9b, 9c and 9d are respectively provided at bottom part discharge outlets 7ae, 7be, 7ce, and 7de of the outer chutes 7a, 7b, 7c, and 7d to hold and discharge the objects to be weighed. Hereinafter, a combination weigher unit including the group A is referred to as a first combination weigher unit, a combination weigher unit including the group B is referred to as a second combination weigher unit, a combination weigher unit including the group C is referred to as a third combination weigher unit, and a combination weigher unit including the group D will be referred to as a fourth combination weigher unit.

Below the collecting hopper 9a of the first combination weigher unit and the collecting hopper 9b of the second combination weigher unit, the lower chute 10a is provided, and the objects to be weighed which have been discharged from the collecting hoppers 9a or 9b are discharged from the discharge outlet 10ae through the lower chute 10a. Below the collecting hopper 8a of the first combination weigher unit and the collecting hopper 8b of the second combination weigher unit, the lower chute 10b is provided, and the objects to be weighed which have been discharged from the collecting hoppers 8a and 8b are discharged from the discharge outlet 10be through the lower chute 10b. Below the collecting hopper 8c of the third combination weigher unit and the collecting hopper 8d of the fourth combination weigher unit, the lower chute 10c is provided, and the objects to be weighed which have been discharged from the collecting hoppers 8c and 8d are discharged from the discharge outlet 10ce through the lower chute 10c. Below the collecting hopper 9c of the third combination weigher unit and the collecting hopper 9d of the fourth combination weigher unit, the lower chute 10d is provided, and the objects to be weighed which have been discharged from the collecting hoppers 9c and 9d are discharged from the discharge outlet 10de through the lower chute 10d.

Below the lower chutes 10a, 10b, 10c and 10d of the combination weigher, four packaging machines (not shown) or a packaging machine (not shown) having four inlets into which the objects to be weighed are fed are disposed. The objects to be weighed which have been discharged from the discharge outlet 10ae of the lower chute 10a, the discharge outlet 10*be* of the lower chute 10*b*, the discharge outlet 10*ce* of the lower chute 10*c*, and the discharge outlet 10*de* of the lower chute 10*d* are respectively fed into the different packaging machine inlets (first to fourth packaging machine inlets) and are charged into package bags for packaging. Thus, in the present example, the objects to be weighed which have been discharged from the collecting hopper 9*a* in the first combination weigher unit and the collecting hopper 9*b* in the second combination weigher unit are fed into the first packaging machine inlet through the lower chute 10*a*, and the objects to be weighed which have been discharged from the collecting hopper 8*a* in the first combination weigher unit and the collecting hopper 8*b* in the second combination weigher unit are fed into the second packaging machine inlet through the lower chute 10*b*. Also, the objects to be weighed which have been discharged from the collecting hopper 8*c* in the third combination weigher unit and from the collecting hopper 8*d* in the fourth combination weigher unit are fed into the third packaging machine inlet through the lower chute 10*c*, and the objects to be weighed which have been discharged from the collecting hopper 9*c* in the third combination weigher unit and from the collecting hopper 9*d* in the fourth combination weigher unit are fed into the fourth packaging machine inlet through the lower chute 10*d*

The control unit 20 (see FIG. 5(*a*)) is equipped to control an operation of the entire combination weigher of the present example and to perform a combination process to determine a combination (discharge combination) made up of the weighing hoppers 4 and the memory hoppers 5 which will discharge the objects to be weighed for each of the first, second, third and fourth combination weigher units. The combination process for each combination weigher unit is identical to that of the example a.

The other configuration is identical to that of the example a and will not be further described. In the present example b, as in the example a, by setting the number of the weighing hoppers 4 and the memory hoppers 5 to nine or ten in each of the groups A, B, C, and D and by setting the number of weighing hoppers 4 and memory hoppers 5 which would be selected to form one optimal combination in the combination process to four, high combination weighing precision is obtained.

In the example b, operation timings are taken for each pair of two combination weigher units arranged adjacent each other. In the present example, the first combination weigher unit and the second combination weigher unit form a pair and the third combination weigher unit and the fourth combination weigher unit form a pair.

The timing charts for the first combination weigher unit and the second combination weigher unit are similar to those of, for example, FIG. 7, and the timing charts for the third combination weigher unit and the fourth combination weigher unit are similar to those for the first combination weigher unit and the second combination weigher unit. That is, the pair of the first and second combination weigher units and the pair of the third and fourth combination weigher units in the present example may be configured to operate as in the first and second combination weigher units in the example a, and description therefor will be omitted. It should be noted that the pair of the first and second combination weigher units and the pair of the third and fourth combination weigher units in the present example may be controlled based on different feed command signals. That is, it is necessary to set Tw/2 time difference between the operation timings for the two combination weigher units forming each pair as shown in FIG. 7, but any special correlation need not be made between the operation timings for the two pairs.

The combination weigher according to the example b is identical to the combination weigher according to the example a except for the number of pairs of the combination weigher units, and is able to achieve advantages similar to those of the combination weigher of the example a.

In the example a, the configuration in which the two combination weigher units (one pair of combination weigher units) are equipped, and in the example b, the configuration in which the four combination weigher units (two pairs of combination weigher units) are equipped. In the same manner, combination weigher units of even number which is six or more (three or more pairs of combination weigher units) may be equipped.

Example c of Embodiment 2

A combination weigher (weighing system) according to an example c of the embodiment 2 of the present invention is configured in such a manner that the two lower chutes 10*a* and 10*b* are omitted from the example a shown in FIG. 5 and the four collecting hoppers 8*a*, 8*b*, 9*a*, and 9*b* are respectively able to discharge the objects to be weighed in the same direction, for example, in a straight-downward direction. The other configuration is identical to that of the example a and will not be described. Hereinafter, description will be given with reference to FIG. 5 (in the example c, the lower chutes 10*a* and 10*b* are omitted as described above).

In the example c, a first combination weigher unit including the group A consisting of the weighing hoppers 4 and the memory hoppers 5 and a second combination weigher unit including the group B consisting of the weighing hoppers 4 and the memory hoppers 5 are configured to operate at the same timings and the four collecting hoppers 8*a*, 8*b*, 9*a*, and 9*b* are configured to discharge the objects to be weighed simultaneously. As in the example a, for the first and second combination weigher units, the first combination process, the second combination process, or the third combination process is performed to determine two discharge combinations simultaneously.

Figure 10:
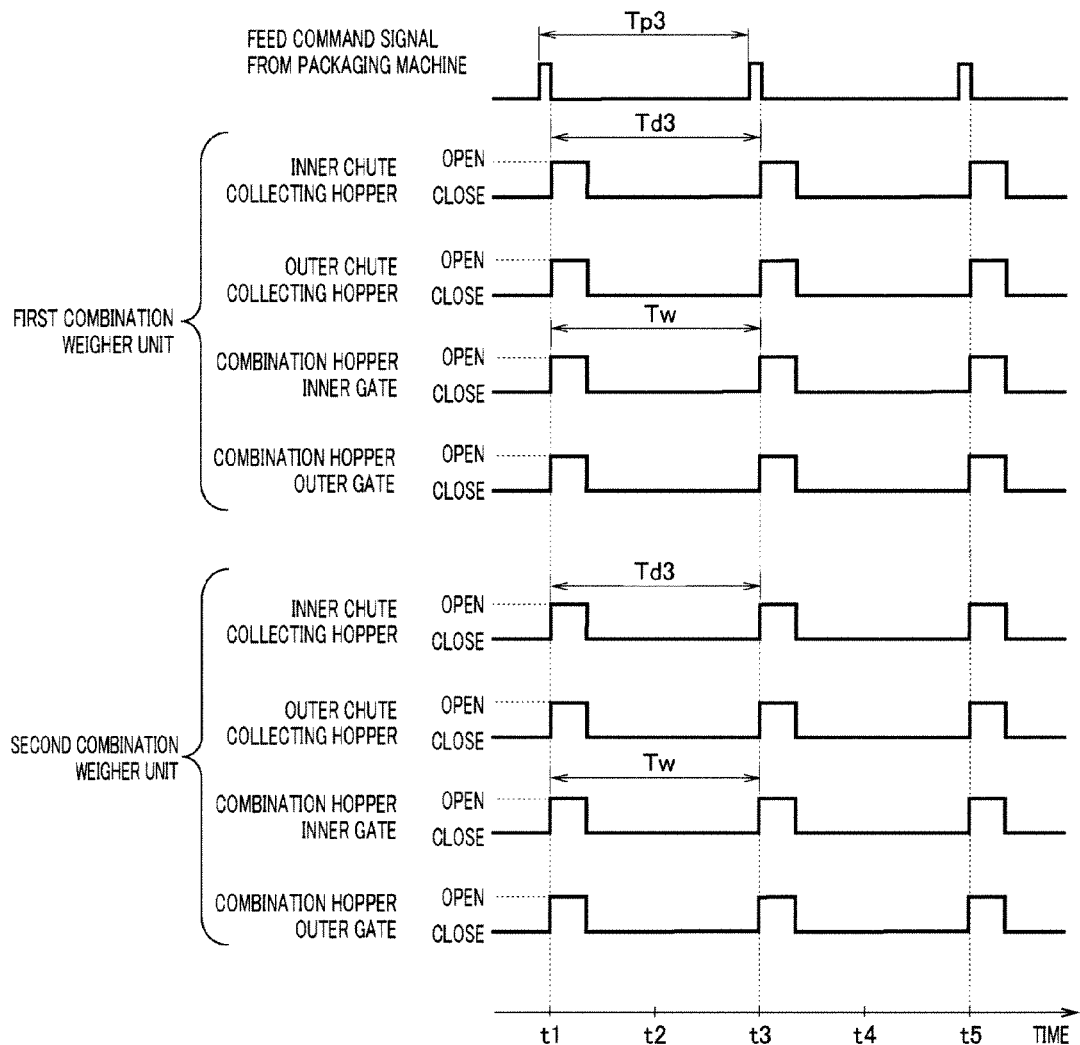
FIG. 10 is a timing chart showing an operation of a combination weigher according to an example c of the embodiment 2 of the present invention.

FIG. 10 is a timing chart showing the operation of the combination weigher according to the example c.

Whereas in the example a, the first combination weigher unit and the second combination weigher unit operate with a time difference of Tw/2 time as shown in FIG. 7, they operate at the same timings in the example c. In this case, one discharge cycle time Td3 for each combination weigher unit is equal to one operation cycle time Tw. The one discharge cycle time Td3 is equal to one packaging cycle time Tp3 for the packaging machine.

A combination process for determining two discharge combinations simultaneously is performed once in every Tw time for each combination weigher unit, and the combination hoppers 4 and 5 making up of the two discharge combinations determined in the combination process discharge the objects to be weighed simultaneously once in every Tw time in each combination weigher unit. In addition, in each combination weigher unit, the inner chute collecting hopper (8*a* or 8*b*) and the outer chute collecting chopper (9*a* or 9*b*) discharge the objects to be weighed simultaneously once in every Tw time. The operation of each combination weigher unit is similar to that of the example a and will not be further described in detail.

Below the combination weigher, four packaging machines (not shown) or a packaging machine having four inlets (not shown) into which the objects to be weighed are fed are disposed. The objects to be weighed which have been discharged simultaneously from the four collecting hoppers 8*a*, 8*b*, 9*a*, and 9*b* are fed into different packaging machine inlets (first to fourth packaging machine inlets) and are packaged in the packaging machine(s).

The combination weigher according to the example c is identical to the combination weigher according to the example a except for timings when the combination weigher units operate and the packaging machine inlets toward which the objects to be weighed are discharged, and is able to achieve advantages similar to those of the combination weigher of the example a.

By causing the two combination weigher units to operate at the same timings as in the example c, the objects to be weighed are fed into each of the four packaging machine inlets once in every Tw time. Since the objects to be weighed are discharged once to each of the four packaging machine inlets within the one operation cycle time Tw, productivity within a specified time period can be improved.

Figure 11:
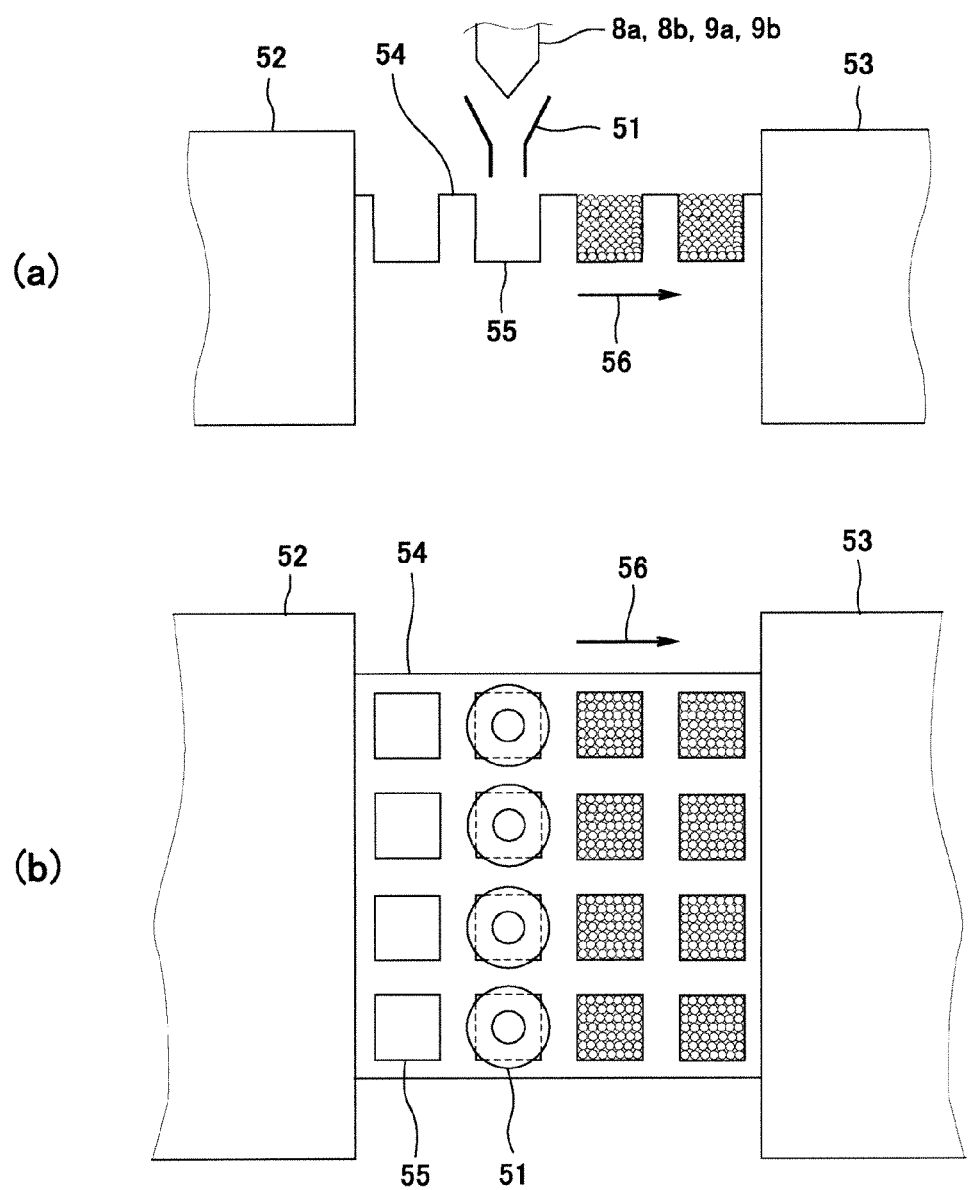
FIG. 11(a) is a cross-sectional view showing a schematic construction according to an example of a packaging machine disposed below the combination weigher according to the example c of the embodiment 2 of the present invention and FIG. 11(b) is a schematic plan view of the packaging machine as viewed from above.

One example of the packaging machine having the four packaging machine inlets is shown in FIG. 11. FIG. 11(*a*) is a schematic cross-sectional view showing a vacuum packaging machine and FIG. 11(*b*) is a schematic plan view of the packaging machine as viewed from above.

In the packaging machine, funnels 51 are respectively disposed under the four collecting hoppers 8*a*, 8*b*, 9*a*, and 9*b* of the combination weigher. In this case, the funnels 51 are packaging machine inlets. It should be noted that openings of package bags or package containers manufactured or used in the packaging machine are packaging machine inlets into which the objects to be weighed are fed, depending on the type of the packaging machine.

In the packaging machine, first, a forming part 52 suctions and heats a resin-made film drawn from a roll to manufacture four package containers 55 simultaneously. The resin-made film forming the package containers 55 is held by a conveyor means such as a belt conveyor which is not shown and is conveyed intermittently in a direction indicated by an arrow 56. Receiving, for example, a feed command signal from the packaging machine as an input, the combination weigher discharges the objects to be weighed simultaneously from the four collecting hoppers 8*a*, 8*b*, 9*a*, and 9*b*. The objects to be weighed are fed to the package containers 55 through the associated funnels 51. Receiving, for example, a discharge completion signal, from the combination weigher, and being ready for conveying the resin-made firm, the packaging machine conveys subsequent four package containers 55 to under the four funnels 51 and stops. The packaging machine sends a feed command signal to the combination weigher. Thereby, the four package containers 55 are fed with the objects to be weighed simultaneously, and then are conveyed to a lid seal part 53. In the lid sealing part 53, a resin-made film is bonded to upper surfaces of the package containers 55 to close the openings of the package containers 55. Thereafter, in a cutting part (not shown) positioned in a subsequent stage of the lid seal part 53, the resin-made film is cut for each package container 55 or each set of four package containers 55.

Another example of the packaging machine adapted to the combination weigher according to the example c, may be a package bag supply type packaging machine configured in such a manner that separate four package bags are conveyed to locations under the four collecting hoppers 8*a*, 8*b*, 9*a*, and 9*b* simultaneously, the objects to be weighed which have been discharged from these collecting hoppers are fed into openings of the package bags through funnels or the like, and thereafter the openings of the package bags are sealed. Still another example of the packaging machine may be configured in such a manner that one or two resin-made films are drawn out from a roll and is subjected to heat treatment and pressurization treatment so that four package bags connected to each other are manufactured simultaneously, these package bags are transported to locations under the collecting hoppers 8*a*, 8*b*, 9*a*, and 9*b*, objects to be weighed which have been discharged from these collecting hoppers are fed into openings of the package bags through funnels and the like, thereafter, the openings of the package bags are sealed, and the resin-made films are separated by cutting for each package bag. A still another example of the packaging machine may be a packaging line configured in such a manner that each set of four resin-made package containers manufactured in advance (e.g., package containers which are formed by separating the package containers 55 in FIG. 11) are sequentially put on a belt conveyor and are transported to locations under the four collecting hoppers 8*a*, 8*b*, 9*a*, and 9*b*, and the openings of the package containers are closed by the resin-made film or the like after the combination weigher feeds the objects to be weighed to the four package containers simultaneously.

Figure 13:
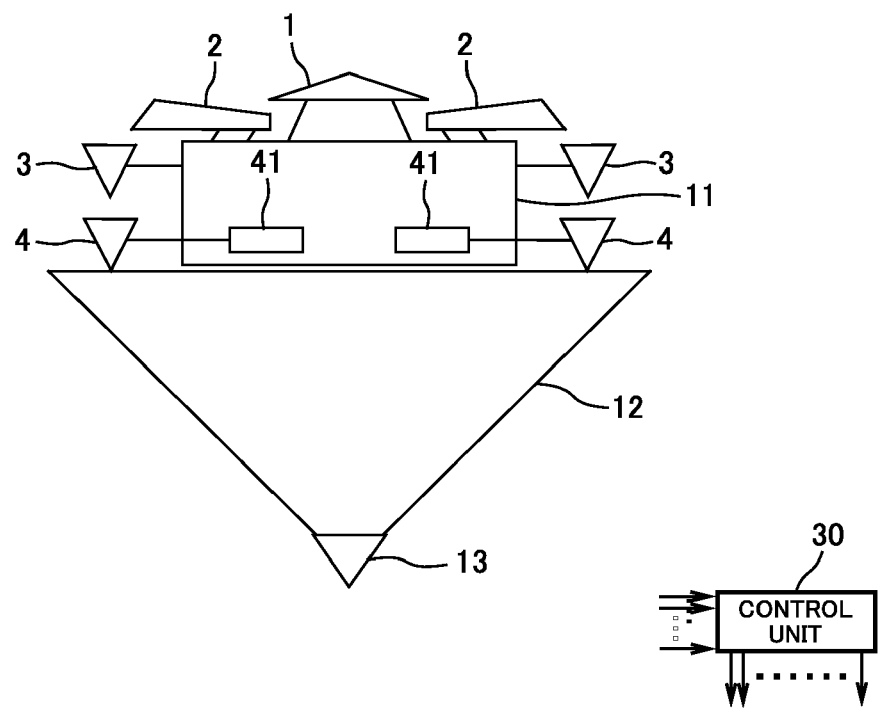
FIG. 13 is a schematic partial cross-sectional view of a combination weigher according to a first conventional example as viewed from laterally.
Figure 14:
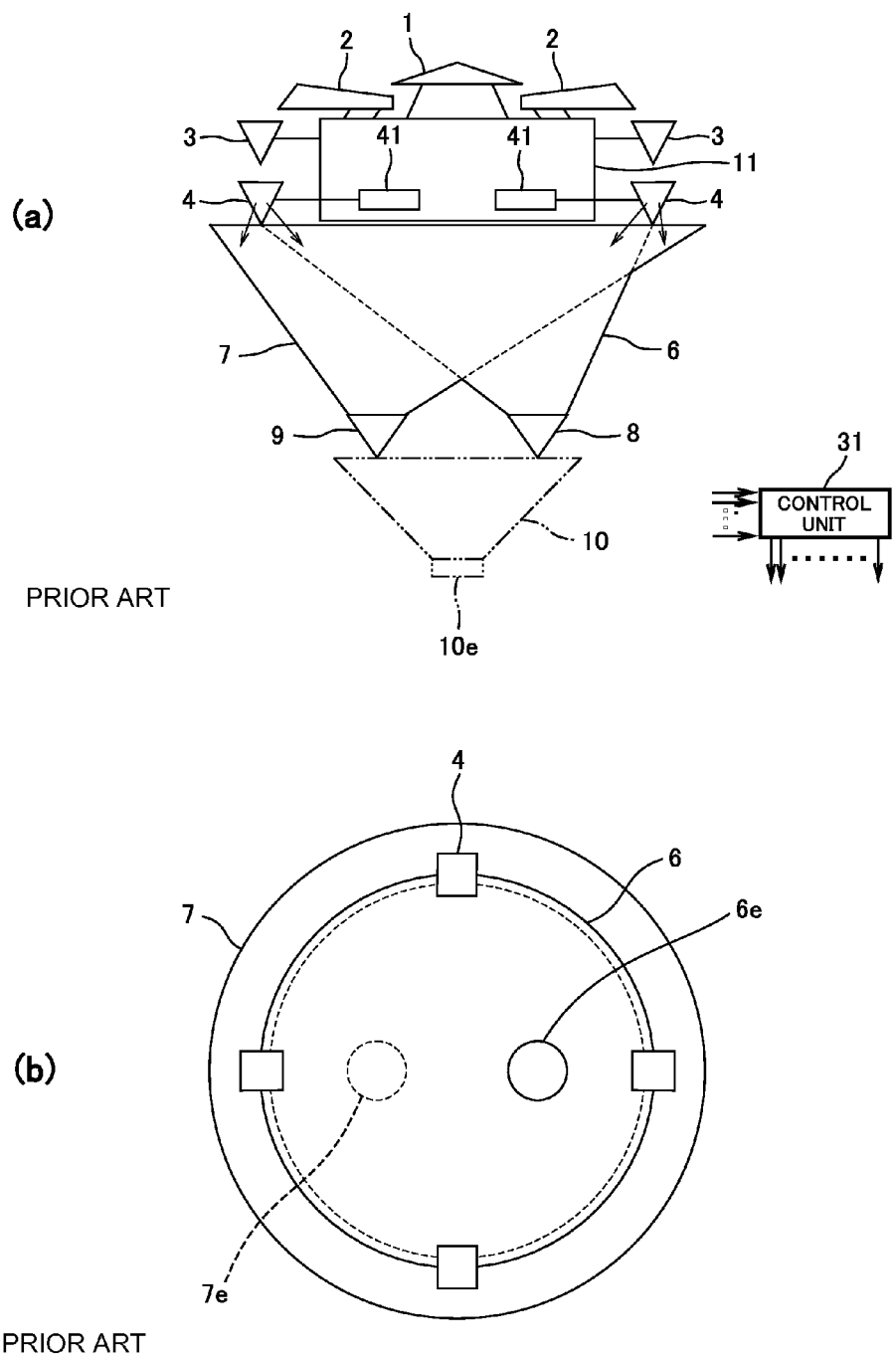
FIG. 14(a) is a schematic partial cross-sectional view of a combination weigher according to a second conventional example as viewed from laterally.
FIG. 14(b) is a schematic view showing collecting chutes and weighing hoppers of the combination weigher as viewed from above.

In cases where the conventional combination weigher shown in, for example, FIG. 13 is used to discharge four sets of the objects to be weighed as in the example c, the following configurations (1) to (3) may be employed.

(1) Four combination weighers are configured to operate at the same operation timings so that each combination weigher discharge one set of objects to be weighed, thus discharging four sets of objects to be weighed simultaneously.

(2) Two combination weighers and a sorting discharge apparatus are used, and the two combination weighers are configured to operate at the same timings and carry out the double shift operation. In this case, each combination weigher discharges one set of objects to be weighed once in every ½ of one operation cycle time Tw. Therefore, two sets of objects to be weighed are discharged from the whole of the two combination weighers once in every Tw/2 time, and four sets of objects to be weighed are discharged therefrom within Tw time. In this case, the sorting discharge apparatus is required to individually receive the four sets of objects to be weighed which are discharged within Tw time and to discharge them to the packaging machine simultaneously. For example, four discharge hoppers (first to fourth discharge hoppers) are arranged in a straight line shape under collecting hoppers 13 (FIG. 13) of the two combination weighers, and the sorting discharge apparatus is constituted by the two collecting hoppers 13 and the four discharge hoppers. One of the two collecting hoppers 13 is configured to be able to discharge the objects to be weighed to the first discharge hopper and to the second discharge hopper alternately, while the other collecting hopper 13 is configured to be able to discharge the objects to be weighed to the third discharge hopper and to the fourth discharge hopper alternately. The four discharge hoppers are configured to discharge the objects to be weighed to the packaging machine simultaneously, when these four discharge hoppers hold the objects to be weighed.

One combination weigher and one sorting apparatus are used. Combination calculation is performed once in every Tw/4 time. Weighing hoppers 4 making up of a combination selected in the combination calculation discharge the objects to be weighed, and according to the discharge, the collecting hopper 13 discharges the objects to be weighed (hereinafter this operation is referred to as "fourth shift operation"). In this case, one set of objects to be weighed are discharged from the combination weigher once in every Tw/4 time, and therefore four sets of objects to be weighed are discharged within Tw time. In this case, also, the sorting discharge apparatus is required to individually receive four sets of objects to be weighed which are discharged within Tw time and to discharge them to the packaging machine simultaneously, as in the above (2) case, although its configuration is different. To form the sorting discharge apparatus used in this case, for example, the sorting discharge apparatus described in the above (2) case may be altered to have two stages.

In the configuration of the above (1) case, because of the need for the four combination weighers, equipment cost increases. In the configuration of the above (2) case, because of the need for the two combination weighers and the expensive sorting discharge apparatus, equipment cost increases. In the configuration of the above (3) case, because of the need for the sorting discharge apparatus which has a more complex structure and is more expensive than in the above (2) case, equipment cost increases. Furthermore, the double shift operation in the configuration of the above (2) case and the fourth shift operation in the configuration of the above (4) case may arise a problem that, since each combination weigher has only one collecting chute 12 (FIG. 13), a distance between the batches of the objects to be weighed which are discharged from the weighing hoppers 4 selected in a previous combination onto the collecting chute 12 and the objects to be weighed which are discharged from the weighing hoppers 4 selected in a subsequent combination onto the collecting chute 12 becomes insufficiently large, depending on characteristics of the objects to be weighed, making high-speed operation difficult.

In contrast to these configurations, the combination weigher of the example c, is able to operate at a high speed irrespective of characteristics of almost all the objects to be weighed and without substantially increasing equipment cost.

Whereas in the configuration c, the combination weigher equipped with the two combination weigher units has been described, it may alternatively be equipped with three or more combination weigher units in the same manner. For example, in cases where the combination weigher is equipped with three combination weigher units, six collecting hoppers 8a, 8b, 8c, 9a, 9b, and 9c are equipped as shown in FIG. 4(a) to discharge the objects to be weighed simultaneously from the six collecting hoppers. In this case, in the packaging machine, for example, in the packaging machine shown in FIG. 11, six package containers 55 are manufactured simultaneously and are conveyed, and the objects to be weighed are fed to the package containers 55 through the associated funnels 51. In this case, since the six collecting hoppers are not aligned as shown in FIG. 4(a), the six funnels 51 are shape-changed to be able to guide the objects to be weighed to the six package containers 55 which are aligned. For example, the funnels 51 may be shape-changed in such a manner that an upper part receiver opening of each funnel 51 is located under the associated collecting hopper, and a pipe portion forming a lower part of the funnel 51 is made slightly longer so that a lower end of the pipe portion is located immediately above the associated package container 55.

Whereas in the first and second embodiments, the weighing hoppers 4 and the memory hoppers 5 arranged in a circular shape are divided into a plurality of groups and one combination weigher is equipped with combination weigher units respectively corresponding to the plurality of groups, a combination weigher (circular-arc shaped combination weigher) consisting of a combination weigher unit corresponding to one group may be used, for example. One example of this is a combination weigher which includes the dispersion feeder 1, the first combination weigher unit corresponding to the group A and the lower chute 10a in the configuration 1 shown in FIG. 1 and is configured to carry out the double shift operation or the triple shift operation. In this case, the feeding hoppers 3, the weighing hoppers 4 and the memory hoppers 5 are arranged in a semi-circular shape, and according to the shape, the linear feeder 2 is disposed. Therefore, the shape of the dispersion feeder 1 for feeding the objects to be weighed to the linear feeder 2 is changed. In this case, the combination weigher is configured substantially in a semi-circular shape (sector form having a central angle of approximately 180 degrees) as viewed from above. Likewise, a combination weigher which includes the dispersion feeder 1, the first combination weigher unit corresponding to the group A and the lower chute 10a in the configuration 2 shown in FIG. 4 and is configured to carry out the double shift operation or the triple operation, may be shaped in a sector form having a central angle of approximately 120 degrees as viewed from above. The objects to be weighed which have been discharged from these combination weighers having the sector form are fed into one package machine inlet through the lower chute 10a. Also, the lower chute 10a may be omitted from the above configuration and the objects to be weighed which have been discharged from the two collecting hoppers 8a and 9a (e.g., see FIG. 1) of the first combination weigher unit may be fed into different two packaging machine inlets. In the above configuration, the double shift operation or the triple shift operation may be replaced by any of the first, second, and third combinations processes and the operation described in the embodiment 2, and the objects to be weighed which have been discharged from the two collecting hoppers 8a and 9a (e.g., see FIG. 1) of the first combination weigher unit may be fed into two different packaging machine inlets without providing the lower chute 10a. The above described combination weigher is equipped with only the combination weigher unit corresponding to one group (e.g., group A in FIG. 1, group A in FIG. 4, or group A in FIG. 9, etc) made up of the combination hoppers 4 and 5 and is configured in such a manner that the feeding hoppers 3, the weighing hoppers 4, and the memory hoppers 5 are arranged in a circular-arc shape having a central angle of approximately 180 degrees or smaller.

In the examples of the embodiments 1 and 2, and the above described circular-arc shaped combination weigher, required lower chutes (10a, 10b, 10c, and 10d) may be equipped in the packaging machine.

Figure 12:
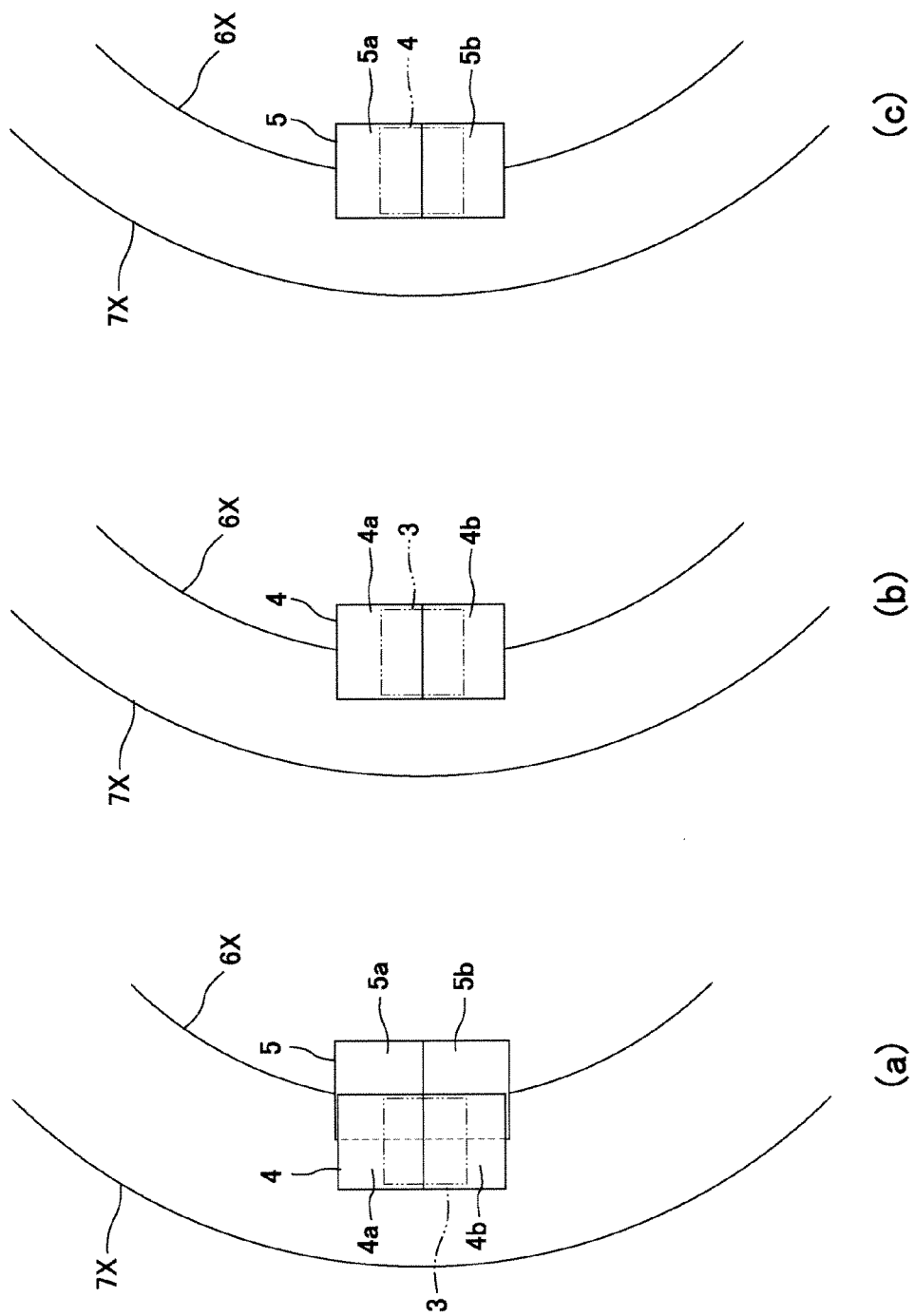
FIGS. 12(a), 12(b), and 12(c) are schematic views showing another examples of hoppers for use in the combination weighers according to the embodiments 1 and 2 of the present invention.

Whereas in the examples of the embodiments 1 and 2, and the above described circular-arc shaped combination weigher, the weighing hoppers 4 and the memory hoppers 5 located obliquely therebelow are illustrated as the combination hoppers fed with the objects to be weighed whose measured values are used in the combination calculation, these combination hoppers are merely exemplary. FIGS. 12(a), 12(b), and 12(c) are plan views schematically showing hoppers such as combination hoppers according to another examples. In FIGS. 12(a), 12(b), and 12(c), an inner chute 6X corresponds to the inner chutes 6a and 6b and others in FIGS. 1 and 5 and the outer chute 7X corresponds to the outer chutes 7a and 7b and others in FIGS. 1 and 5. Each weighing hopper 4 shown in FIGS. 12(a), 12(b), and 12(c) is attached with one weight sensor 41 (see FIGS. 1 and 5).

For example, as shown in FIG. 12(a), each weighing hopper 4 may be configured to have two chambers (weighing chambers) 4a and 4b which are respectively fed with the objects to be weighed and a memory hopper 5 having two chambers (accommodating chambers) 5a and 5b respectively corresponding to the weighing chambers 4a and 4b of the weighing hopper 4 may be provided obliquely below each weighing hopper 4. The two weighing chambers 4a and 4b of each weighing hopper 4 may be arranged side by side substantially in the same direction as the direction in which the plurality of weighing hoppers 4 are arranged, and the two accommodating chambers 5a and 5b of each memory hopper 5 may be arranged side by side substantially in the same direction as the direction in which the plurality of memory hoppers 5 are arranged. In this case, the feeding hopper 3 is configured to be able to discharge the objects to be weighed selectively to the weighing chamber 4a or to the weighing hopper 4b of the weighing hopper 4. The weighing chamber 4a of the weighing hopper 4 is configured to be able to discharge the objects to be weighed selectively to the accommodating chamber 5a of the memory hopper 5 or to the outer chute 7X, while the weighing chamber 4b of the weighing hopper 4 is configured to be able to discharge the objects to be weighed selectively to the accommodating chamber 5b of the memory hopper 5 or to the outer chute 7X. The two accommodating chambers 5a and 5b of the memory hopper 5 are each configured to be able to discharge the objects to be weighed selectively to the inner chute 6A or to the outer chute 7X. The combination calculation is performed using weights (measured values) of the objects to be weighed inside the weighing chambers 4a and 4b of each weighing hopper 4 and weights (measured values) of the objects to be weighed inside the accommodating chambers 5a an 5b of each memory hopper 5, and the weighing chambers 4a and 4b and the accommodating chambers 5a and 5b are candidates to be selected to make up of a discharge combination. In each weighing hopper 4, when one weighing chamber, for example, weighing chamber 4a holds the objects to be weighed, the weight sensor 41 measures the weight of the objects to be weighed inside the weighing chamber 4a. Then, when the other weighing chamber 4b is fed with the objects to be weighed, the weight sensor 41 measures a total weight of the objects to be weighed inside the two weighing chambers 4a and 4b. The control unit 20 (see FIGS. 1 and 5) calculates the weight (measured value) of the objects to be weighed inside the weighing chamber 4b by subtracting the weight of the objects to be weighed inside the weighing chamber 4a from the total weight of the objects to be weighed inside the two weighing chambers 4a and 4b. As the measured values of the objects to be weighed inside the accommodating chambers 5a and 5b, measured values obtained by measurement and calculation in the weighing chambers 4a and 4b of the weighing hopper located thereabove are used. In this case, if the weighing chamber 4a or 4b is selected to make up of a discharge combination for discharging the objects to be weighed to the inner chute 6X, the corresponding accommodating chamber 5a or 5b is selected simultaneously. For example, when the corresponding weighing chamber 4a and accommodating chamber 5a are selected simultaneously, the objects to be weighed inside the weighing chamber 4a are discharged to the inner chute 6X through the accommodating chamber 5a.

As shown in FIG. 12(b), each weighing hopper 4 may be configured to have two weighing chambers 4a and 4b without providing the memory hopper 5. The two weighing chambers 4a and 4b of each weighing hopper 4 may be arranged side by side substantially in the same direction as the direction in which the plurality of weighing hoppers 4 are arranged. In this case, the feeding hopper 3 is configured to be able to discharge the objects to be weighed selectively to the weighing chamber 4a or to the weighing hopper 4b of the weighing hopper 4. The two weighing chambers 4a and 4b of the weighing hopper 4 may be configured to be able to discharge the objects to be weighed selectively to the inner chute 6A or to the outer chute 7X. The combination calculation is performed using the weights (measured values) of the objects to be weighed inside the weighing chambers 4a and 4b of each weighing hopper 4 and the weighing chambers 4a and 4b are candidates to be selected to make up of a discharge combination. The weights of the objects to be weighed inside the weighing chambers 4a and 4b are calculated in the same manner as that of FIG. 12(a).

As shown in FIG. 12(c), each memory hopper 5 may be configured to have two accommodating chambers 5a and 5b. The two accommodating chambers 5a and 5b of each memory hopper 5 may be arranged side by side substantially in the same direction as the direction in which the plurality of memory hoppers 5 are arranged. Herein, the feeding hopper 3 (see FIGS. 1 and 5) for feeding the objects to be weighed to the weighing hopper 4 is not illustrated. In this case, the weighing hopper 4 is configured to be able to discharge the objects to be weighed selectively to the accommodating chamber 5a or to the accommodating chamber 5b of the memory hopper 5 and is configured not to discharge the objects to be weighed to the inner chute 6X and to the outer chute 7X. The two accommodating chambers 5a and 5b of the memory hopper 5 are each configured to be able to discharge the objects to be weighed selectively to the inner chute 6X or to the outer chute 7X. The combination calculation is, for example, performed using the weights (measured values) of the objects to be weighed inside the accommodating chambers 5a and 5b of each memory hopper 5, and the accommodating chambers 5a and 5b are candidates to be selected to make up of a discharge combination but the weighing hopper 4 does not participate in a combination. As the weights of the objects to be weighed inside the accommodating chambers 5a and 5b, weights measured in the weighing hopper 4 located thereabove are used. The weighing hopper 4 is able to participate in a combination provided that the weighing hopper 4 and the accommodating chamber 5a or 5b of the corresponding memory hopper 5 are selected simultaneously. For example, when the weighing hopper 4 and the accommodating chamber 5a of the corresponding memory hopper 5 are selected to make up of a discharge combination simultaneously, the objects to be weighed inside the weighing hopper 4 are discharged onto the inner chute 6X or onto the outer chute 7X through the accommodating chamber 5a.

In addition to the above, the configuration of the hoppers such as the combination hoppers or the like may be changed in various ways. In the configuration shown in the examples of the embodiments 1 and 2, in which the weighing hoppers 4 and the memory hoppers 5 are equipped, two measured values for use in combination calculation are obtained for each weight sensor 41 attached on the associated weighing hopper 4. In the configuration shown in FIG. 12(a), four measured values for use in combination calculation are obtained for each weight sensor 41. In the configuration shown in FIG. 12(b), two measured values for use in combination calculation are obtained for each weight sensor 41. In the configuration shown in FIG. 12(c), two measured values for use in combination calculation are obtained for each weight sensor 41 when the weighing hoppers 4 do not participate in a combination, while three measured values for use in combination calculation are obtained for each weight sensor 41 when the weighing hoppers 4 participate in a combination. With these hopper configurations, efficient use of the weight sensors 41 which are expensive is achieved. In addition, without increasing a diameter of a circle along which the combination hoppers are arranged, the number of measured values for use in the combination calculation can be increased so that combination weighing precision is improved.

Moreover, in the above described embodiments 1 and 2, the control unit 20 is not limited to being configured as the single control apparatus, but instead may be configured to include a plurality of control apparatuses disposed in a distributed manner, and these control apparatuses may co-operate to control the operation of the combination weigher.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A combination weigher and a weighing system of the present invention are useful as a combination weigher, a weighing system and others which are coupled to a packaging machine operated at a high speed or a twin-type packaging machine, etc.

The invention claimed is:

1. A combination weigher comprising:
    a combination hopper line formed by a plurality of combination hoppers which are arranged in a circular-arc shape having a central angle of approximately 180 degrees or smaller and are fed with objects to be weighed, the plurality of combination hoppers being each configured to be able to discharge the objects to be weighed selectively in an inward direction which is toward a center of the circular-arc shape or in an outward direction which is an opposite direction of the inward direction;
    an inner chute which is disposed below the combination hopper line and has an upper end portion of a circular-arc shape conforming to the shape of the combination hopper line, the inner chute being configured to gather the objects to be weighed which have been discharged in the inward direction from the combination hoppers and to discharge the objects to be weighed from a discharge outlet provided at a bottom part thereof;
    an outer chute which is disposed along outside of the inner chute, the outer chute being configured to gather the objects to be weighed which have been discharged in the outward direction from the combination hoppers and to discharge the objects to be weighed from a discharge outlet provided at a bottom part thereof;
    a first collecting hopper which is provided at the discharge outlet of the inner chute to hold and discharge the objects to be weighed which have been discharged from the discharge outlet of the inner chute;
    a second collecting hopper which is provided at the discharge outlet of the outer chute to hold and discharge the objects to be weighed which have been discharged from the discharge outlet of the outer chute;
    a combination calculation means which is configured to determine a first discharge combination and a second discharge combination each of which is made up of combination hoppers in which a combination weight value which is a total of weights of the objects to be weighed which have been fed to the combination hoppers is within an allowable range with respect to a target weight value; and
    a control means which is configured to cause the combination hoppers making up of the first discharge combination to discharge the objects to be weighed in the inward direction and to cause the combination hoppers making up of the second discharge combination to discharge the objects to be weighed in the outward direction, and is configured to cause the first collecting hopper holding the objects to be weighed which have been discharged from the combination hoppers making up of the first discharge combination to discharge the objects to be weighed and to cause the second collecting hopper holding the objects to be weighed which have been discharged from the combination hoppers making up of the second discharge combination to discharge the objects to be weighed;
    wherein the combination hopper line includes two lines including an upper line and a lower line, wherein the combination hoppers forming the upper line are weighing hoppers which weigh the objects to be weighed which have been fed to the weighing hoppers, and wherein the combination hoppers forming the lower line are memory hoppers, each of the memory hoppers paired with a corresponding one of the weighing hoppers, each memory hopper being fed with the objects to be weighed which have been weighed in the corresponding one of the weighing hoppers;
    wherein the weighing hoppers are each configured to be able to discharge the objects to be weighed selectively to the corresponding memory hopper or to the outer chute;
    wherein the memory hoppers are each configured to be able to discharge the objects to be weighed selectively to the inner chute or to the outer chute; and
    wherein the combination calculation means is configured to determine a first discharge combination such that a weighing hopper and a corresponding memory hopper are included in the first discharge combination when the weighing hopper is selected to make up of the first discharge combination.

2. The combination weigher according to claim 1,
    wherein the combination calculation means is configured to repeatedly perform a combination process in which combination calculation is performed based on the weights of the objects to be weighed which have been fed to the combination hoppers to determine one combination made up of the combination hoppers in which a combination weight value is within the allowable range with respect to the target weight value and to determine the combination as an optimal combination; and
    the combination calculation means is configured to repeatedly perform the combination process n times, wherein n is a plural number, in such a manner that, the combination calculation is performed based on weights of objects to be weighed which have been fed to combination hoppers which do not make up of an optimal combination determined in a previous combination process, in a subsequent combination process, and is configured to determine optimal combinations determined sequentially in the combination process performed repeatedly as the first discharge combination and the second discharge combination alternately;
    the control means is configured to cause the combination hoppers making up of the first discharge combination and the combination hoppers making up of the second discharge combination to alternately discharge the objects to be weighed and to cause the first collecting hopper and the second collecting hopper to alternately discharge the objects to be weighed, based on the first discharge combination and the second discharge combination alternately determined by the combination calculation means; and
    wherein the objects to be weighed which have been discharged from the first collecting hopper and the objects to be weighed which have been discharged from the second collecting hopper are fed into the same packaging machine inlet.

3. The combination weigher according to claim 1,
wherein the combination calculation means is configured to repeatedly perform a combination process in which combination calculation is performed based on the weights of the objects to be weighed which have been fed to the combination hoppers to determine one combination made up of the combination hoppers in which a combination weight value is within the allowable range with respect to the target weight value and to determine the combination as an optimal combination; and the combination calculation means is configured to repeatedly perform the combination process n (plural number) times in such a manner that, the combination calculation is performed based on weights of objects to be weighed which have been fed to combination hoppers which do not make up of an optimal combination determined in a previous combination process, in a subsequent combination process, and is configured to determine optimal combinations determined sequentially in the combination process performed repeatedly as the first discharge combination and the second discharge combination alternately;

the control means is configured to cause the combination hoppers making up of the first discharge combination and the combination hoppers making up of the second discharge combination to alternately discharge the objects to be weighed and to cause the first collecting hopper and the second collecting hopper to alternately discharge the objects to be weighed, based on the first discharge combination and the second discharge combination alternately determined by the combination calculation means; and wherein the objects to be weighed which have been discharged from the first collecting hopper and the objects to be weighed which have been discharged from the second collecting hopper are fed into different packaging machine inlets.

4. The combination weigher according to claim 1,
wherein the combination calculation means is configured to perform a combination process in which combination calculation is performed based on the weights of the objects to be weighed which have been fed to the combination hoppers to determine two combinations which do not include the same combination hoppers and in which combination weight values obtained in the combination calculation are within the allowable range with respect to the target weight value, one of the two combinations is determined as the first discharge combination and the other of the two combinations is determined as the second discharge combination;

wherein the control means is configured to cause the combination hoppers making up of the first discharge combination and the combination hoppers making up of the second discharge combination which have been determined by the combination calculation means to discharge the objects to be weighed simultaneously, and to cause the first collecting hopper and the second collecting hopper to discharge the objects to be weighed simultaneously; and wherein the objects to be weighed which have been discharged from the first collecting hopper and the objects to be weighed which have been discharged from the second collecting hopper are fed into different packaging machine inlets.

5. A weighing system comprising:
a plurality of weighing units, each of the weighing units including a combination weigher comprising:

a combination hopper line formed by a plurality of combination hoppers which are arranged in a circular-arc shape having a central angle of approximately 180 degrees or smaller and are fed with objects to be weighed, the plurality of combination hoppers being each configured to be able to discharge the objects to be weighed selectively in an inward direction which is toward a center of the circular-arc shape or in an outward direction which is an opposite direction of the inward direction;

an inner chute which is disposed below the combination hopper line and has an upper end portion of a circular-arc shape conforming to the shape of the combination hopper line, the inner chute being configured to gather the objects to be weighed which have been discharged in the inward direction from the combination hoppers and to discharge the objects to be weighed from a discharge outlet provided at a bottom part thereof;

an outer chute which is disposed along outside of the inner chute, the outer chute being configured to gather the objects to be weighed which have been discharged in the outward direction from the combination hoppers and to discharge the objects to be weighed from a discharge outlet provided at a bottom part thereof;

a first collecting hopper which is provided at the discharge outlet of the inner chute to hold and discharge the objects to be weighed which have been discharged from the discharge outlet of the inner chute;

a second collecting hopper which is provided at the discharge outlet of the outer chute to hold and discharge the objects to be weighed which have been discharged from the discharge outlet of the outer chute;

a combination calculation means which is configured to determine a first discharge combination and a second discharge combination each of which is made up of combination hoppers in which a combination weight value which is a total of weights of the objects to be weighed which have been fed to the combination hoppers is within an allowable range with respect to a target weight value; and a control means which is configured to cause the combination hoppers making up of the first discharge combination to discharge the objects to be weighed in the inward direction and to cause the combination hoppers making up of the second discharge combination to discharge the objects to be weighed in the outward direction, and is configured to cause the first collecting hopper holding the objects to be weighed which have been discharged from the combination hoppers making up of the first discharge combination to discharge the objects to be weighed and to cause the second collecting hopper holding the objects to be weighed which have been discharged from the combination hoppers making up of the second discharge combination to discharge the objects to be weighed;

the plurality of weighing units being configured such that combination hopper lines corresponding to the plurality of weighing units are continuously arranged and combination hoppers corresponding to the plurality of weighing units are arranged in a circular shape;

wherein a total number of the weighing units is an even number;

wherein the combination calculation means in each of the weighing units is configured to perform a combination process in which combination calculation is performed based on the weights of the objects to be weighed which have been fed to the combination hoppers within the weighing unit to determine two combinations which do not include the same combination hoppers and in which combination weight values obtained in the combination calculation are within an allowable range with respect to a target weight value and to determine the two combinations as the first discharge combination and the second discharge combination;

wherein the control means in each of the weighing units is configured to perform an internal discharge process for causing the combination hoppers making up of the first discharge combination determined by the combination calculation means within the weighing unit and the combination hoppers making up of the second discharge combination determined by the combination calculation means to discharge the objects to be weighed simultaneously, and an external discharge process for causing the first collecting hopper and the second collecting hopper to discharge the objects to be weighed simultaneously;

wherein two weighing units including combination hopper lines arranged adjacent each other are predetermined as a pair unit, the objects to be weighed which have been discharged from one of the first collecting hopper and the second collecting hopper of the weighing units forming the pair unit are fed to one of a pair of packaging machine inlets corresponding to the pair unit, and the objects to be weighed which have been discharged from the other collecting hopper are fed to the other packaging machine inlet; and wherein each of the weighing units is configured to repeatedly perform a series of processes including the combination process, the internal discharge process and the external discharge process, with a time difference of substantially ½ of one operation cycle time that lapses from when an external discharge process in the weighing unit is terminated until a subsequent external discharge process in the weighing unit starts, the time difference being set between the two weighing units forming the pair unit; and wherein the combination calculation means in each of the weighing units is configured to perform:

a first process in which the combination calculation is performed based on weights of the objects to be weighed which have been fed to the combination hoppers within the weighing unit to determine, as allowable combinations, combinations made up of combination hoppers in which combination weight values are within the allowable range with respect to the target weight value, m allowable combinations are selected, wherein m is a plural number, as first optimal combinations, from the allowable combinations, by giving priority to allowable combinations in which absolute values of differences between combination weight values and the target weight value are smaller, one allowable combination is selected as a second optimal combination from allowable combinations made up of combination hoppers obtained by excluding the combination hoppers belonging to each of the first optimal combinations, and m optimal combination sets each of which is made up of corresponding first and second optimal combinations are determined; and a second process in which for each of the optimal combination sets, a total of absolute values of differences between combination weight values of the first and second optimal combinations and the target weight value is calculated to select one optimal combination set in which the total of the absolute values of the differences is smallest, one of the first and second optimal combinations included in the selected optimal combination set is determined as the first discharge combination and the other of the first and second optimal combinations is determined as the second discharge combination.

6. A weighing system comprising:

a plurality of weighing units, each of the weighing units including a combination weigher comprising:

a combination hopper line formed by a plurality of combination hoppers which are arranged in a circular-arc shape having a central angle of approximately 180 degrees or smaller and are fed with objects to be weighed, the plurality of combination hoppers being each configured to be able to discharge the objects to be weighed selectively in an inward direction which is toward a center of the circular-arc shape or in an outward direction which is an opposite direction of the inward direction;

an inner chute which is disposed below the combination hopper line and has an upper end portion of a circular-arc shape conforming to the shape of the combination hopper line, the inner chute being configured to gather the objects to be weighed which have been discharged in the inward direction from the combination hoppers and to discharge the objects to be weighed from a discharge outlet provided at a bottom part thereof;

an outer chute which is disposed along outside of the inner chute, the outer chute being configured to gather the objects to be weighed which have been discharged in the outward direction from the combination hoppers and to discharge the objects to be weighed from a discharge outlet provided at a bottom part thereof;

a first collecting hopper which is provided at the discharge outlet of the inner chute to hold and discharge the objects to be weighed which have been discharged from the discharge outlet of the inner chute;

a second collecting hopper which is provided at the discharge outlet of the outer chute to hold and discharge the objects to be weighed which have been discharged from the discharge outlet of the outer chute;

a combination calculation means which is configured to determine a first discharge combination and a second discharge combination each of which is made up of combination hoppers in which a combination weight value which is a total of weights of the objects to be weighed which have been fed to the combination hoppers is within an allowable range with respect to a target weight value; and a control means which is configured to cause the combination hoppers making up of the first discharge combination to discharge the objects to be weighed in the inward direction and to cause the combination hoppers making up of the second discharge combination to discharge the objects to be weighed in the outward direction, and is configured to cause the first collecting hopper holding the objects to be weighed which have been discharged from the combination hoppers making up of the first discharge combination to discharge the objects to be weighed and to cause the second collecting hopper holding the objects to be weighed which have been discharged from the combination hoppers making up of the second discharge combination to discharge the objects to be weighed;

the plurality of weighing units being configured such that combination hopper lines corresponding to the plurality of weighing units are continuously arranged and combination hoppers corresponding to the plurality of weighing units are arranged in a circular shape;

wherein the combination hopper line of the plurality of weighing units includes two lines which are upper and lower combination hopper lines, combination hoppers forming the upper combination hopper line are weighing hoppers which weigh weights of the objects to be weighed which have been fed to the weighing hoppers, combination hoppers forming the lower combination hopper line are memory hoppers which are provided to respectively correspond to the weighing hoppers and are fed with the objects to be weighed which have been weighed in the weighing hoppers; the weighing hoppers are each configured to be able to discharge the objects to be weighed selectively to the corresponding memory hopper or to the outer chute, and the memory hoppers are each configured to be able to discharge the objects to be weighed selectively to the inner chute or to the outer chute; and wherein the combination calculation means in each of the weighing units is configured to determine a first discharge combination such that a weighing hopper and a corresponding memory hopper are included in the first discharge combination when the weighing hopper is selected to make up of the first discharge combination.

7. The weighing system according to claim 6, wherein combination calculation means in each of the weighing units is configured to repeatedly perform a combination process in which combination calculation is performed based on weights of the objects to be weighed which have been fed to the combination hoppers within the weighing unit to determine one combination made up of combination hoppers in which a combination weight value is within an allowable range with respect to a target weight value and to determine the combination as an optimal combination; and the combination calculation means in each of the weighing units is configured to repeatedly perform the combination process n (plural number) times in such a manner that, the combination calculation is performed based on weights of objects to be weighed which have been fed to combination hoppers which do not make up of an optimal combination determined in a previous combination process, in a subsequent combination process, and is configured to determine optimal combinations determined sequentially in the combination process performed repeatedly as the first discharge combination and the second discharge combination alternately;

the control means in each of the weighing units is configured to cause the combination hoppers making up of the first discharge combination and the combination hoppers making up of the second discharge combination to alternately discharge the objects to be weighed and to cause the first collecting hopper and the second collecting hopper within the weighing unit to alternately discharge the objects to be weighed, based on the first discharge combination and the second discharge combination alternately determined by the combination calculation means within the weighing unit; and wherein the objects to be weighed which have been discharged from the first collecting hopper and from the second collecting hopper belonging to the same weighing unit are fed to the same packaging machine inlet, and the objects to be weighed which have been discharged from the first collecting hopper and from the second collecting hopper belonging to different weighing units are fed to different packaging machine inlets.

8. The weighing system according to claim 6, wherein a total number of the weighing units is an even number;

wherein the combination calculation means in each of the weighing units is configured to perform a combination process in which combination calculation is performed based on the weights of the objects to be weighed which have been fed to the combination hoppers within the weighing unit to determine two combinations which do not include the same combination hoppers and in which combination weight values obtained in the combination calculation are within an allowable range with respect to a target weight value and to determine the two combinations as the first discharge combination and the second discharge combination;

wherein the control means in each of the weighing units is configured to perform an internal discharge process for causing the combination hoppers making up of the first discharge combination determined by the combination calculation means within the weighing unit and the combination hoppers making up of the second discharge combination determined by the combination calculation means to discharge the objects to be weighed simultaneously, and an external discharge process for causing the first collecting hopper and the second collecting hopper to discharge the objects to be weighed simultaneously;

wherein two weighing units including combination hopper lines arranged adjacent each other are predetermined as a pair unit, the objects to be weighed which have been discharged from one of the first collecting hopper and the second collecting hopper of the weighing units forming the pair unit are fed to one of a pair of packaging machine inlets corresponding to the pair unit, and the objects to be weighed which have been discharged from the other collecting hopper are fed to the other packaging machine inlet; and wherein each of the weighing units is configured to repeatedly perform a series of processes including the combination process, the internal discharge process and the external discharge process, with a time difference of substantially ½ of one operation cycle time that lapses from when an external discharge process in the weighing unit is terminated until a subsequent external discharge process in the weighing unit starts, the time difference being set between the two weighing units forming the pair unit.

9. The weighing system according to claim 8, wherein the combination calculation means in each of the weighing units is configured to perform:

a first process in which the combination calculation is performed based on the weights of the objects to be weighed which have been fed to the combination hoppers within the weighing unit to determine, as optimal combinations, combinations made up of combination hoppers in which combination weight values are within the allowable range with respect to the target weight value, and to determine optimal combination sets each of which is formed by combining two optimal combinations which do not include the same combination hoppers; and a second process in which for each of the optimal combination sets, a total of absolute values of differences between combination weight values of the optimal combinations included in the optimal combination set and the target weight value are calculated to select one optimal combination set in which the total of the absolute values of the differences is smallest, and one of two optimal combinations included in the selected optimal combination set is determined as the first discharge combination and the other optimal combination is determined as the second discharge combination.

* * * * *

UNITED STATES PATENT AND TRADEMARK OFFICE
CERTIFICATE OF CORRECTION

| | | |
|---|---|---|
| PATENT NO. | : 8,115,118 B2 | Page 1 of 1 |
| APPLICATION NO. | : 12/097232 | |
| DATED | : February 14, 2012 | |
| INVENTOR(S) | : Shozo Kawanishi | |

It is certified that error appears in the above-identified patent and that said Letters Patent is hereby corrected as shown below:

On the Title Page:

Item (73) Assignee:

Delete "(73) Assignee: Shozo Kawanishi, Nishinomiya-shi (JP)"

Signed and Sealed this
Second Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,115,118 B2  
APPLICATION NO. : 12/097232  
DATED : February 14, 2012  
INVENTOR(S) : Shozo Kawanishi Page 1 of 1

It is certified that error appears in the above-identified patent and that said Letters Patent is hereby corrected as shown below:

On the Title Page:

"item (75)" should read -- item (76) --.

Item (73) Assignee:

Delete "(73) Assignee: Shozo Kawanishi, Nishinomiya-shi (JP)"

This certificate supersedes the Certificate of Correction issued September 2, 2014.

Signed and Sealed this  
Twenty-third Day of September, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,115,118 B2  
APPLICATION NO. : 12/097232  
DATED : February 14, 2012  
INVENTOR(S) : Shozo Kawanishi Page 1 of 1

It is certified that error appears in the above-identified patent and that said Letters Patent is hereby corrected as shown below:

Title page

Item (75) Inventor:

Please delete "Shozo Kawanishi, Nishinomiya (JP)" and replace with -- Shozo Kawanishi, Nishinomiya-shi (JP) --.

Signed and Sealed this
Second Day of February, 2016

Michelle K. Lee
*Director of the United States Patent and Trademark Office*